United States Patent
Wartman et al.

(10) Patent No.: US 11,793,616 B2
(45) Date of Patent: *Oct. 24, 2023

(54) DISPENSER FOR DISPOSABLE PRODUCTS

(71) Applicant: One-Two, LLC, Saint Paul, MN (US)

(72) Inventors: Ryan Wartman, Saint Paul, MN (US); Chris Bollis, Orono, MN (US); Jeff Brown, Edina, MN (US); Matthew Goulet, Bloomington, MN (US)

(73) Assignee: ONE-TWO, LLC, Saint Paul, MN (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/635,426

(22) PCT Filed: Dec. 13, 2019

(86) PCT No.: PCT/US2019/066220
§ 371 (c)(1),
(2) Date: Feb. 15, 2022

(87) PCT Pub. No.: WO2021/040771
PCT Pub. Date: Mar. 4, 2021

(65) Prior Publication Data
US 2022/0287808 A1 Sep. 15, 2022

Related U.S. Application Data

(63) Continuation of application No. 16/555,503, filed on Aug. 29, 2019, now Pat. No. 10,548,697.

(51) Int. Cl.
*B65D 83/08* (2006.01)
*A47F 1/08* (2006.01)
(Continued)

(52) U.S. Cl.
CPC .............. *A61C 15/043* (2013.01); *A47F 1/08* (2013.01); *A61C 15/046* (2013.01); *B65D 11/12* (2013.01); *B65D 83/0805* (2013.01)

(58) Field of Classification Search
CPC .................................. B65D 11/12; A47F 1/08
See application file for complete search history.

(56) References Cited

U.S. PATENT DOCUMENTS

| 889,568 A | 6/1908 | Albrecht |
| 2,450,635 A | 10/1948 | Dembenski |

(Continued)

FOREIGN PATENT DOCUMENTS

| AU | 696781 B | 9/1998 |
| CN | 202051840 U | 11/2011 |

(Continued)

OTHER PUBLICATIONS

A-Titan; Dental Floss Dispenser, May 23, 2019; https://www.atitan.com/products/300-dental-floss-dispenser.

(Continued)

*Primary Examiner* — Timothy R Waggoner
(74) *Attorney, Agent, or Firm* — GRUMBLES LAW PLLC; Brittany Haanan

(57) ABSTRACT

A refillable dispenser including a housing and a cover. The housing can include an internal cavity, an activation mechanism cavity separate from the internal cavity, and a multi-state actuator structured to alternate between compressed and extended positions. The internal cavity can be structured and configured to house individual products in a stacked orientation, and the activation mechanism cavity can house the multi-state actuator. The cover can include an open bottom and can fit over and around the housing. By pushing the cover down, the user activates the multi-state actuator and causes it to extend, which pushes the cover up and (Continued)

causes a bottom portion of the housing to be exposed so that the user can remove one product at a time. The dispenser can be mirrored about a vertical or horizontal plane to allow it to dispense from either end, thereby making the dispenser ambidextrous.

20 Claims, 12 Drawing Sheets

(51) Int. Cl.
*A61C 15/04* (2006.01)
*B65D 6/06* (2006.01)

(56) References Cited

U.S. PATENT DOCUMENTS

| | | | |
|---|---|---|---|
| 2,620,061 A | 12/1952 | Uxa | |
| 2,784,722 A | 3/1957 | Chamberlin et al. | |
| 3,519,004 A | 7/1970 | Foster | |
| 3,968,902 A | 7/1976 | Bachmann | |
| 4,154,365 A * | 5/1979 | Lorca | B65D 83/0409 221/302 |
| 4,245,742 A | 1/1981 | Rossmo | |
| 4,643,334 A | 2/1987 | Steele | |
| 4,807,752 A | 2/1989 | Chodorow | |
| 4,909,578 A | 3/1990 | Abbate | |
| 5,163,561 A | 11/1992 | Fitzgerald | |
| 5,275,291 A | 1/1994 | Sledge | |
| 5,620,109 A | 4/1997 | Madden | |
| 5,732,820 A | 3/1998 | Tsai | |
| 5,785,206 A | 7/1998 | Chan | |
| 5,842,598 A | 12/1998 | Tsuchida | |
| 5,873,495 A | 2/1999 | Saint-Germain | |
| 6,158,615 A * | 12/2000 | Hill | A47F 1/10 221/154 |
| 6,488,036 B1 | 12/2002 | Francis | |
| 6,971,546 B2 | 12/2005 | Costa | |
| 7,036,664 B2 | 5/2006 | Lee et al. | |
| 7,654,273 B2 | 2/2010 | Grendol et al. | |
| 8,297,473 B2 | 10/2012 | Smith | |
| 9,248,935 B2 * | 2/2016 | Bailey | B65D 11/12 |
| 9,265,593 B2 | 2/2016 | Stewart et al. | |
| 9,655,703 B2 | 5/2017 | Studney et al. | |
| 9,994,344 B2 | 6/2018 | Buscema et al. | |
| 10,548,697 B1 * | 2/2020 | Wartman | B65D 11/12 |
| 2006/0091147 A1 | 5/2006 | Arndt | |
| 2006/0289554 A1 | 12/2006 | Mitchell et al. | |
| 2006/0289557 A1 | 12/2006 | Mitchell et al. | |
| 2008/0295859 A1 * | 12/2008 | Grendol | A61C 15/046 132/324 |
| 2008/0302817 A1 | 12/2008 | Arndt | |
| 2010/0084423 A1 | 4/2010 | Zeitman | |
| 2010/0294791 A1 | 11/2010 | Weibel et al. | |
| 2012/0234889 A1 | 9/2012 | Kim | |
| 2016/0361147 A1 | 12/2016 | Chodorow et al. | |
| 2018/0334311 A1 | 11/2018 | Bittner | |

FOREIGN PATENT DOCUMENTS

| | | |
|---|---|---|
| CN | 206403581 U | 8/2017 |
| CN | 107951583 A | 4/2018 |
| CN | 207429202 U | 6/2018 |
| FR | 2779700 A1 | 12/1999 |
| WO | 2005110890 A1 | 11/2005 |
| WO | 2018169823 A1 | 9/2018 |

OTHER PUBLICATIONS

International Search Report and Written Opinion pertaining to PCT/US2019/066220, dated Apr. 21, 2020.
Plackers; Plackers Dental Flossers Mint; May 23, 2019; https://www.walgreens.com/store/c/plackers-dental-flossers- mint/ID=prod6016289-product.
Shenzhen Huicui Electronic Technology Co., Ltd; 32pack/lot Lit-Pack oral hygiene Toothpicks Dental Floss Picks Dental Flosser Tooth Pick; May 23, 2019; https://www.aliexpress.com/item/32box-lot-Lit-Pack-Toothpicks-Dental-Floss-Picks-Dental-Flosser-Tooth-Pick/871139112.html.

* cited by examiner

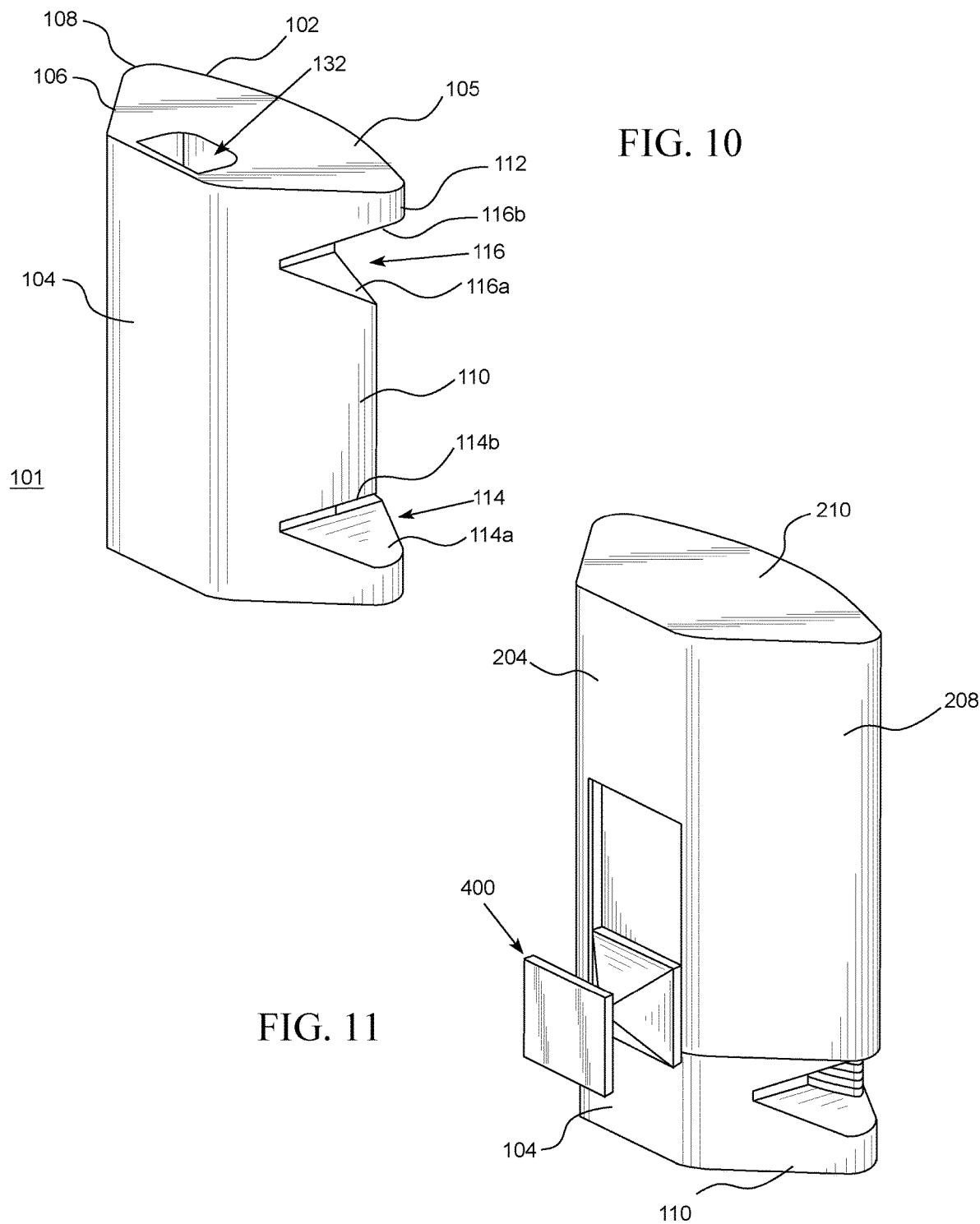

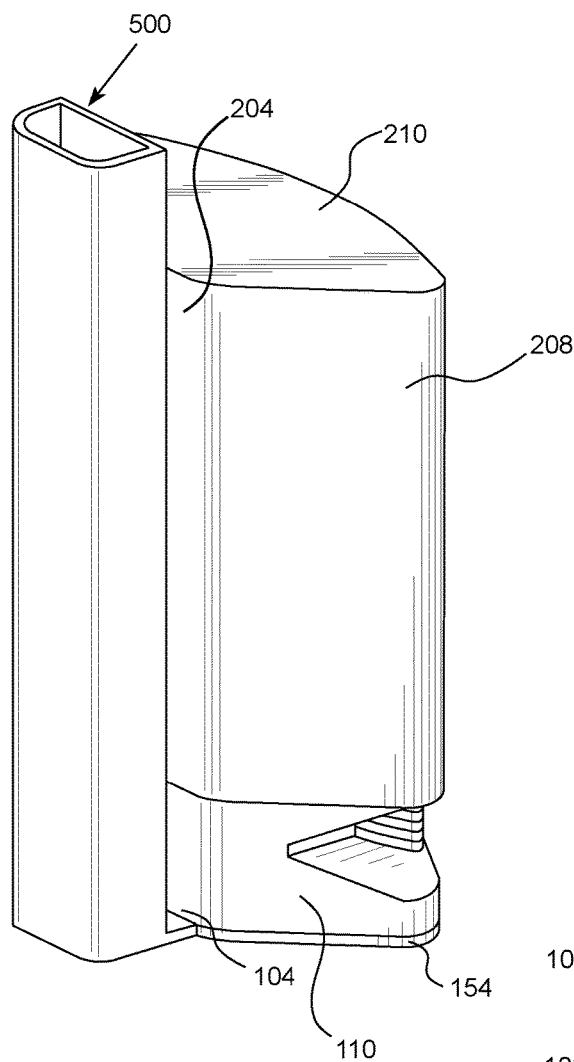
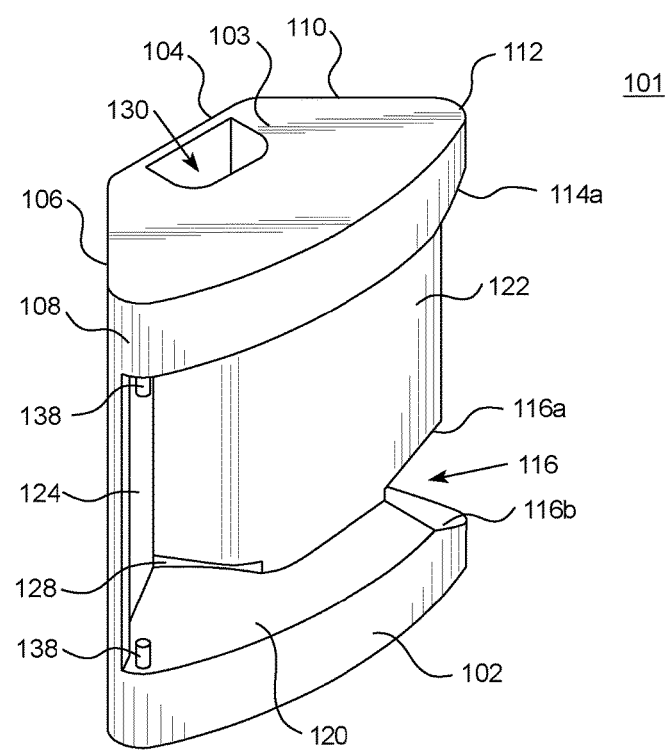
FIG. 12
FIG. 13

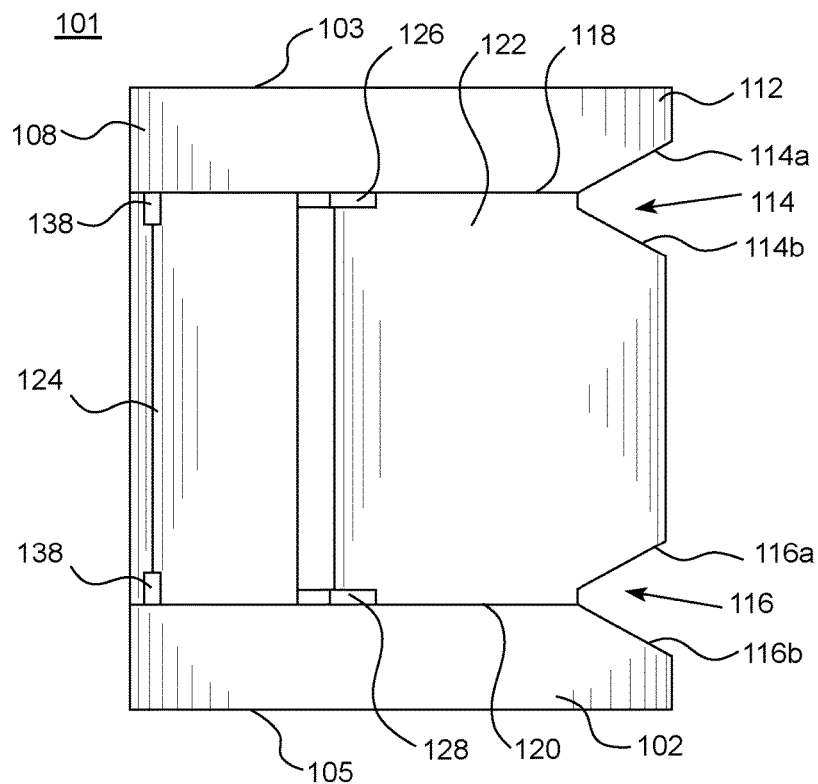
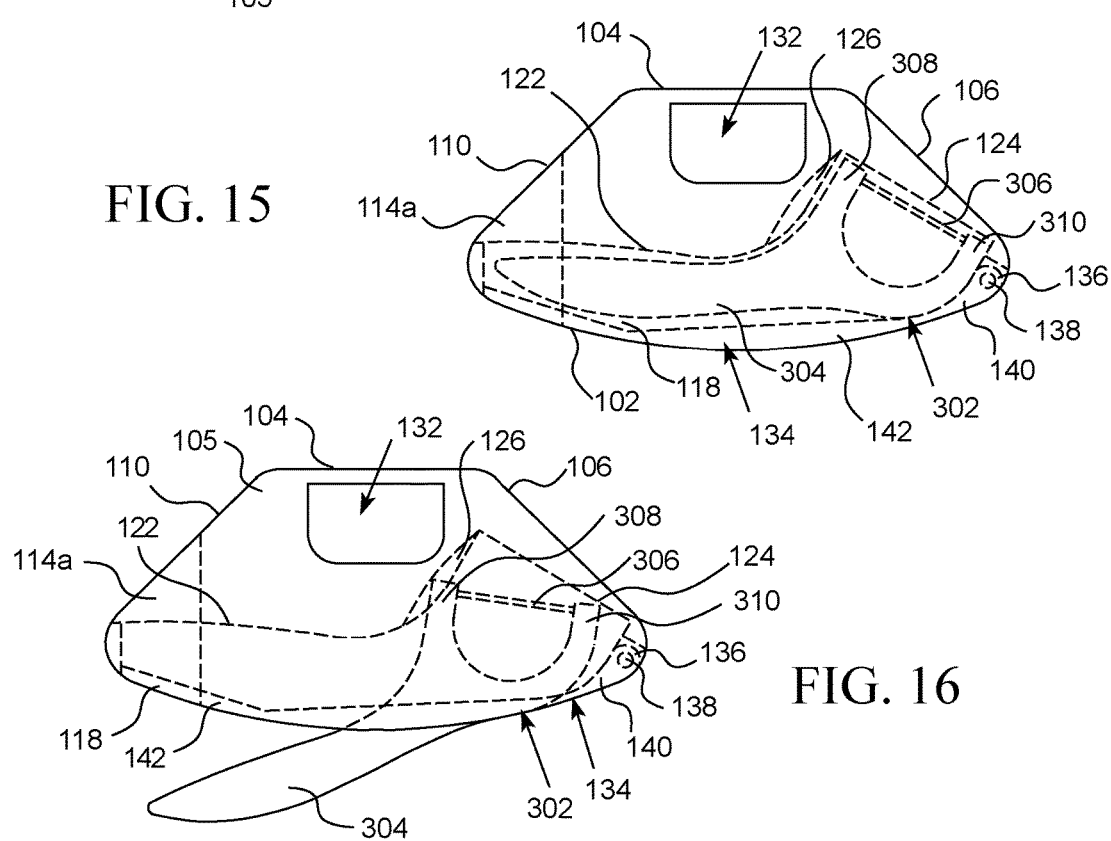
FIG. 14
FIG. 15
FIG. 16

DISPENSER FOR DISPOSABLE PRODUCTS

FIELD OF THE INVENTION

This disclosure relates to dispensers, and more particularly, relates to refillable dispensers for disposable products such as flossers.

BACKGROUND OF THE INVENTION

Dentists frequently inform individuals that they need to floss consistently. However, current flossing products, such as flossers and spooled floss, typically end up at the bottom of bathroom drawers, purses, and bags due to their small size. Further, buying a bag of flossers does not fix this problem, because they're not aesthetically pleasing, and flossers can be time-consuming to extract from them. Therefore, individuals lose motivation to floss due to the difficulty in storing and obtaining floss. A solution is needed that reminds individuals to floss and that makes the process of storing, obtaining and using floss easier and more sanitary.

SUMMARY OF THE INVENTION

This disclosure relates to dispensers, and more particularly, relates to refillable dispensers for disposable products such as flossers. In an illustrative but non-limiting example, the disclosure provides a dispenser that can include a housing and a cover. The housing can include an internal cavity, an activation mechanism cavity, and a multi-state actuator (for example, a bi-state actuator) structured to alternate between various states, including at least a compressed position and an extended position. The internal cavity can be structured and configured to house individual products in a stacked orientation, and the activation mechanism cavity can be separate from the internal cavity and house the multi-state actuator. The cover can include an open bottom and can be structured and configured to have an interior shape larger than the exterior shape of the housing such that the cover fits over and around the housing. The multi-state actuator, in its compressed position, can allow the cover to substantially encompass the housing. By pushing the cover down, the user can activate the multi-state actuator and cause at least a portion of the actuator to extend, which pushes the cover up and causes a bottom portion of the housing to be exposed such that at least one individual product is exposed and the user can remove one product at a time. The dispenser can be mirrored about a vertical or horizontal plane to allow it to dispense from either end, thereby making the dispenser ambidextrous.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which:

FIG. 10 is a back perspective view of the dispensing body of the housing;

FIG. 11 is a back perspective view of the dispenser in an activated configuration, wherein the dispenser includes a wall mount;

FIG. 12 is a back perspective view of the dispenser in an activated configuration, wherein the dispenser includes a toothbrush holder;

FIG. 13 is a front perspective view of the dispensing body;

FIG. 14 is a front view of the dispensing body;

FIG. 15 is a top view of the dispensing body with a flosser in the stored position, wherein the flosser is outlined with phantom lines;

FIG. 16 is a top view of the dispensing body with a flosser in the pivoting position, wherein the flosser is outlined with phantom lines;

DETAILED DESCRIPTION

Figure 1:
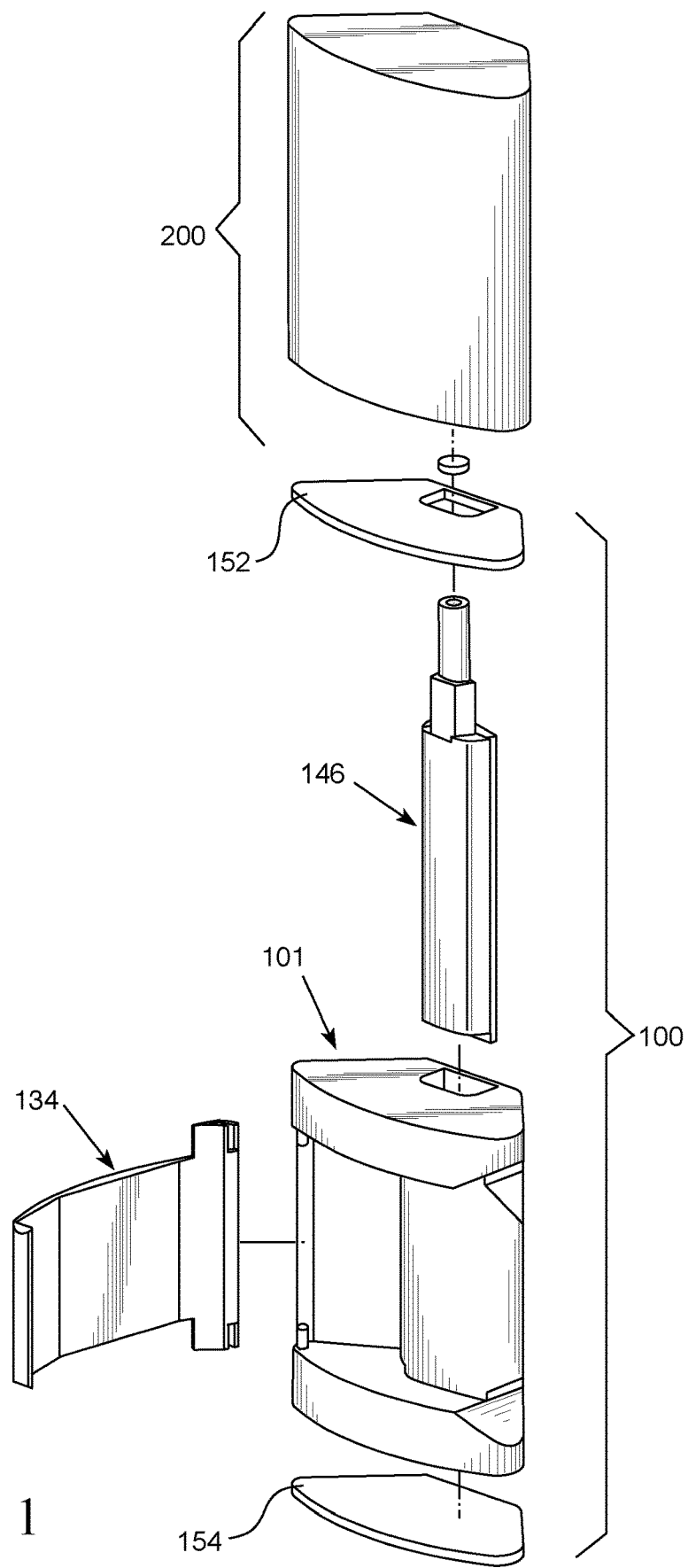
FIG. 1 is an exploded view of an illustrative example of a dispenser of the present disclosure.

The present disclosure relates to dispensers, and more particularly, relates to refillable dispensers for disposable products such as flossers. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements; those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Generally, the dispenser described herein stores disposable products, such as flossers, in a stacked configuration and enables the disposable products to be removed one at a time from the bottom of the stack. More specifically, the disclosed device has a housing that houses disposable products and that is substantially encased by a cover that prevents the housing and enclosed products from coming into contact with moisture, dust, dirt, bacteria, etc. To access the products, a user can push the cover down to activate a multi-state actuator that pushes the cover partially up into an activated configuration. This exposes part of the housing including the dispensing portion. To remove a product, the dispensing body of the housing has a corner wedge cutout that exposes an end of a product and provides a gap in the body of the housing for a user to hook their finger behind the product and pull it forward. After a single product is removed, the stack moves downward due to gravitational forces.

In some embodiments, the top half of the housing of the dispenser is a mirror image of the bottom half. Therefore, the user can remove the cover entirely, flip the housing upside down, and replace the cover to use the device in a different handed configuration. As described herein, a right-handed configuration of the device has the above-referenced corner wedge cutout positioned on the right side of the device (when one is facing the front of the device) so that users can more easily use their right hand to withdraw a product. A left-handed configuration of the device has the corner wedge cutout positioned on the left side of the device so that users can more easily use their left hand to withdraw a product.

In other embodiments, a first portion of the housing of the dispenser has a right side that is a mirror image of the left side, and a second portion of the housing has a top half that is a mirror image of the bottom half. Therefore, the user can remove the second portion of the housing from the first portion, flip the second portion upside down, and replace it in the first portion to use the device in a different handed configuration. As described herein, a right-handed configuration of the device has the second portion of the housing positioned within the first portion such that the corner wedge cutout is positioned on the right side of the device (when one is facing the front of the device) so that users can more easily use their right hand to withdraw a product. A left-handed configuration of the device has the second portion of the housing positioned within the first portion such that the corner wedge cutout is positioned on the left side of the device so that users can more easily use their left hand to withdraw a product.

As referenced herein, dental flossers 300, also known as dental floss picks, generally include a head 302 and a handle 304. Often, the head includes a set of prongs with a piece of floss 306 strung between the tips of each prong. While handle 304 can be straight, more often it has curvature. Additionally, often times the handle attaches nearer to one prong versus centered on both prongs. Therefore, the prongs typically include short prong 308 and long prong 310 instead of two prongs of identical length, and the floss is attached between the short prong and the long prong.

In some embodiments, the flosser height can be defined as the distance between the top and bottom faces of a flosser at its thickest point, the faces of each flosser being the flat surfaces that are in contact with the flossers above and/or below the flosser when stacked together. Further, the flosser length can be defined as the distance between the tip of handle 304 and the tips of short and long prongs 308, 310, and the flosser width can be defined as the distance between the front and back edges of a flosser, although this distance is variable and depends on which portion of the flosser is being referred to.

In some embodiments, flossers 300 may be packaged together as a cartridge for easy refilling. For example, if housing 100 can accommodate up to 30 flossers, a cartridge may be prepackaged to contain up to 25 flossers so that the housing can be refilled while there are still a few remaining flossers in the housing, and the cartridge may be structured and configured to easily insert those flossers into the housing. In other embodiments, as described further herein, flossers 300 may be packaged together in a housing insert that can be loaded into a housing frame. Therefore, when a user runs out of flossers, the user can remove an empty housing insert and load a full housing insert into the housing frame, thereby reusing the housing frame.

FIG. 1 is an exploded view of an illustrative example of a dispenser. Generally, dispenser can include housing 100 and cover 200. Housing 100 can be comprised of dispensing body 101, door 134 attachable to the dispensing body, multi-state actuator 146, and in some cases, cap 152 and base 154, as illustrated in FIG. 1. Dispensing body 101 and door 134 can define an interior space for housing 100, such as an internal cavity, that is structured and configured to house flossers 300 in a stacked orientation for individual removal. In other embodiments, dispensing body 101 of housing 100 can be replaced by housing frame 400 and housing insert 500. Housing frame 400 creates a pocket for housing insert 500, and the combination of the housing insert and door 514 define an interior space for housing 100, such as internal cavity, that is structured and configured to house flossers 300 in a stacked orientation for individual removal.

Figure 2:
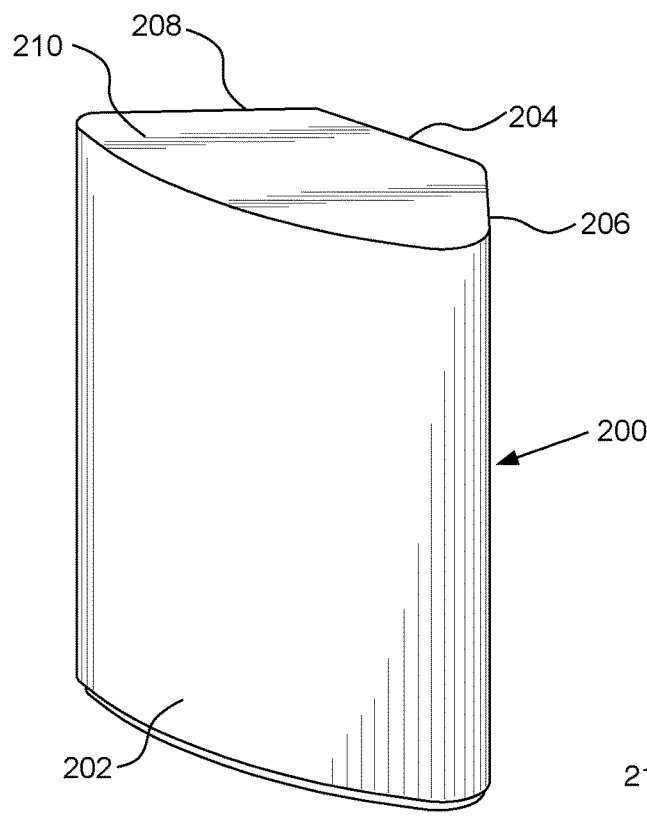
FIG. 2 is a front perspective view of the dispenser in a closed configuration.
Figure 3:
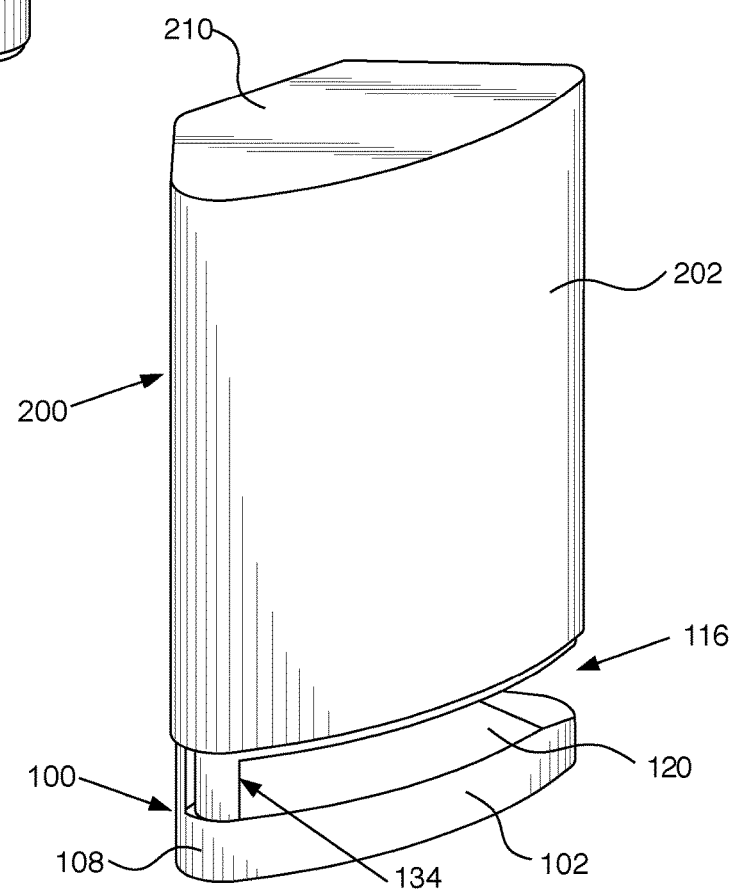
FIG. 3 is a front perspective view of the dispenser in an activated configuration.

Cover 200 can be comprised of open bottom 212 and can be structured and configured to have an interior shape larger than the exterior shape of housing 100, such that the cover fits over and around the housing, as illustrated in FIG. 2. In some embodiments, dispensing body 101 has top activation mechanism cavity 130 and bottom activation mechanism cavity 132 (these may be one continuous cavity instead of two distinct cavities) into which multi-state actuator 146 can be inserted, thereby enabling the dispenser to be used in one of two positions, those two positions being the right-handed and left-handed positions, as described above. Similarly, housing frame 400 may also have activation mechanism cavity 426 but may limit the configuration of dispensing cavity to one position since it is housing insert 500, and not the dispensing cavity, that is reversible and enables the dispenser to be used in the right-handed and left-handed positions. By pushing cover 200 down, the user activates multi-state actuator 146, which causes a bottom portion of housing 100 to be exposed so that the user can remove a single flosser from the dispensing body 101, as illustrated in FIGS. 3-4.

The flosser dispenser described herein is intended to encourage frequent flossing. Further, the structure and configuration of the dispenser makes it more suitable to be placed out in the open (e.g., bathroom countertops, dining tables or other living areas, cafeterias, dentist offices, restaurants, etc.) compared to existing flosser bags and containers, which merely provide an enclosed area with little to no organization and no means of dispensing the flossers. To maintain the sanitary nature of flossers 300 by preventing splashes and other debris from coming into contact with the flossers, cover 200 substantially encompasses housing 100 when multi-state actuator 146 is in its compressed position and, therefore, the device is in its closed and stored configuration, as illustrated in FIG. 2. However, since multi-state actuator 146 can be activated by downward force that causes release of a spring mechanism, a small area of the bottom portion of housing 100 can remain uncovered. In cases where the multi-state actuator is a touch latch assembly, this permits latch extension 150 of the touch latch assembly, also known as a push latch, freedom to move slightly downward from its compressed position so it can be activated. Once activated, multi-state actuator 146 (or, as mentioned above latch extension 150) can move upward into an extended position and push cover 200 upward into a corresponding active configuration, as illustrated in FIG. 3. This action exposes a portion of housing 100 such that at least one product, such as a flosser 300, is visible and accessible for dispensing, as illustrated in FIG. 4.

Housing 100 is rigid in that it cannot easily be bent or otherwise easily forced out of shape. For example, portions or all of housing 100 may be made of any rigid material such as, but not limited to, plastic, wood, or metal (for example, stainless steel or anodized aluminum). In some cases, housing 100 or parts of the housing may be made using injection molding. However, housing 100 and its components can be manufactured in other ways, such as, but not limited to, via 3D printing.

Figures 4, 5:
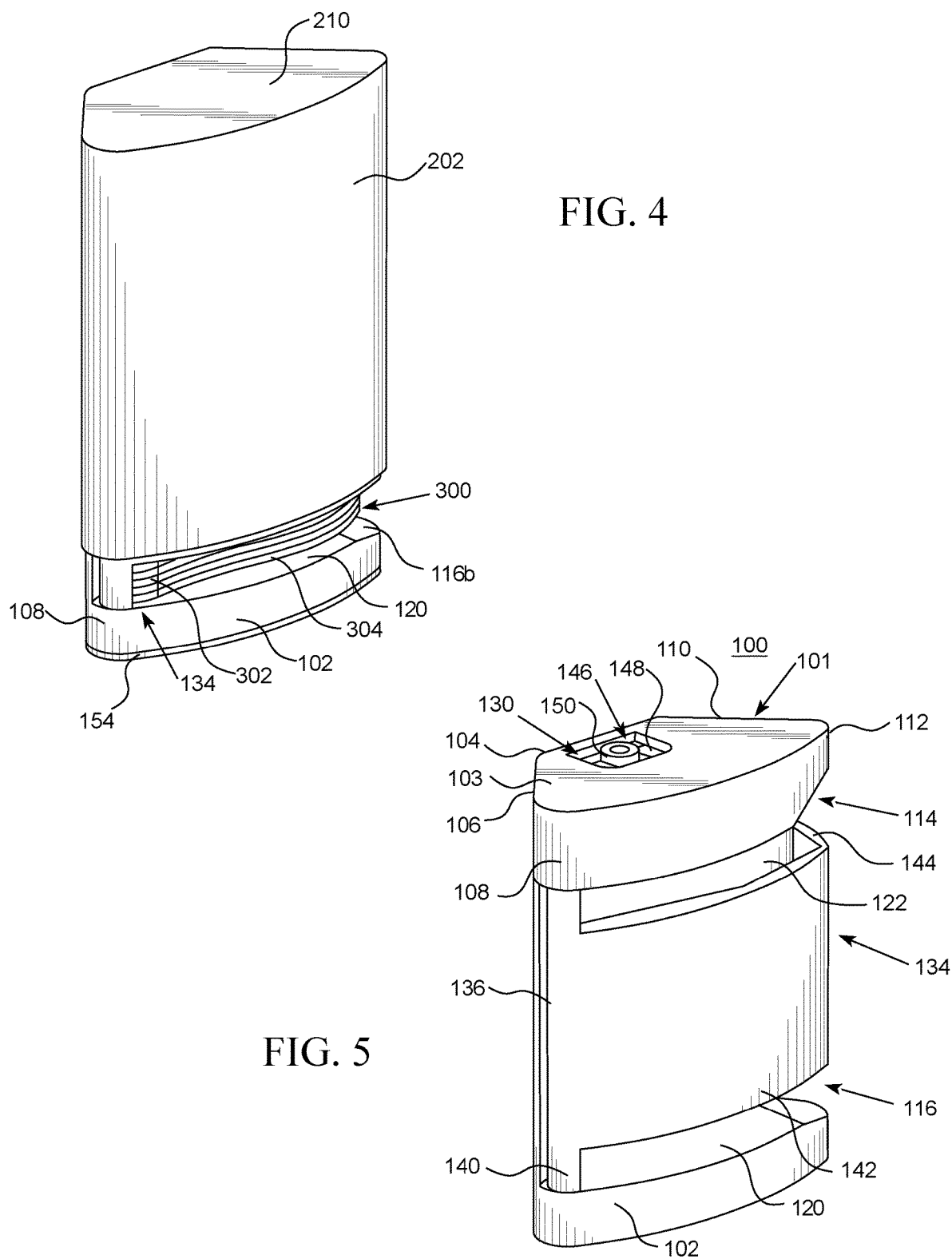
FIG. 4 is a front perspective view of the dispenser in an activated configuration, wherein the dispenser is housing flossers and has a base attached.
FIG. 5 is a front perspective view of the housing of the dispenser with the door closed.
Figure 6:
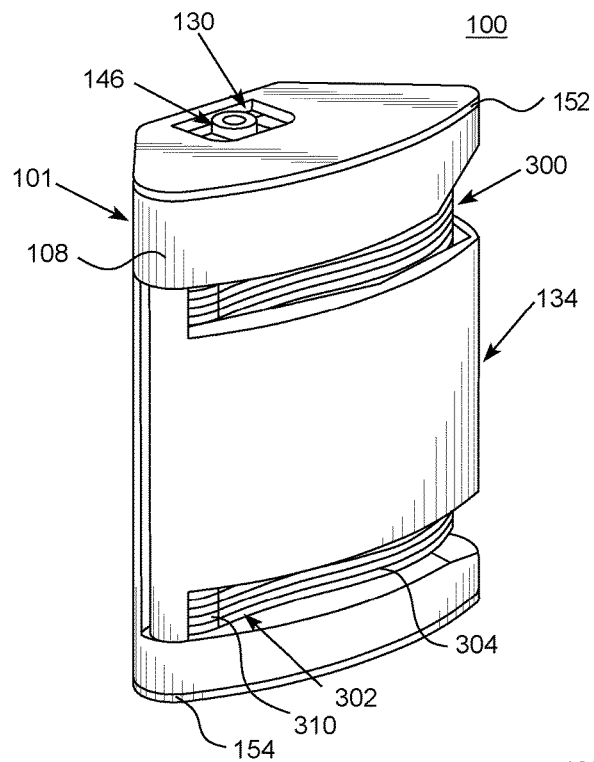
FIG. 6 is a front perspective view of the housing with the door closed, wherein the housing is housing flossers and has a cap and a base attached.

Housing 100 can be generally comprised of dispensing body 101, door 134, and multi-state actuator 146, as illustrated in FIG. 5. As mentioned above, dispensing body 101 and door 134 can define an interior space, such as an internal cavity, that is structured and configured to house flossers 300 in a stacked orientation for individual removal, as illustrated in FIG. 6. More specifically, dispensing body 101 can be shaped similar to a trapezoid and include front face 102, top 103, back face 104, bottom 105, first side 106 having first front edge 108, second side 110 having second front edge 112. In some cases, housing 100 may also include cap 152 attached to top 103 and base 154 attached to bottom 105, as illustrated in FIG. 6.

Figure 19:
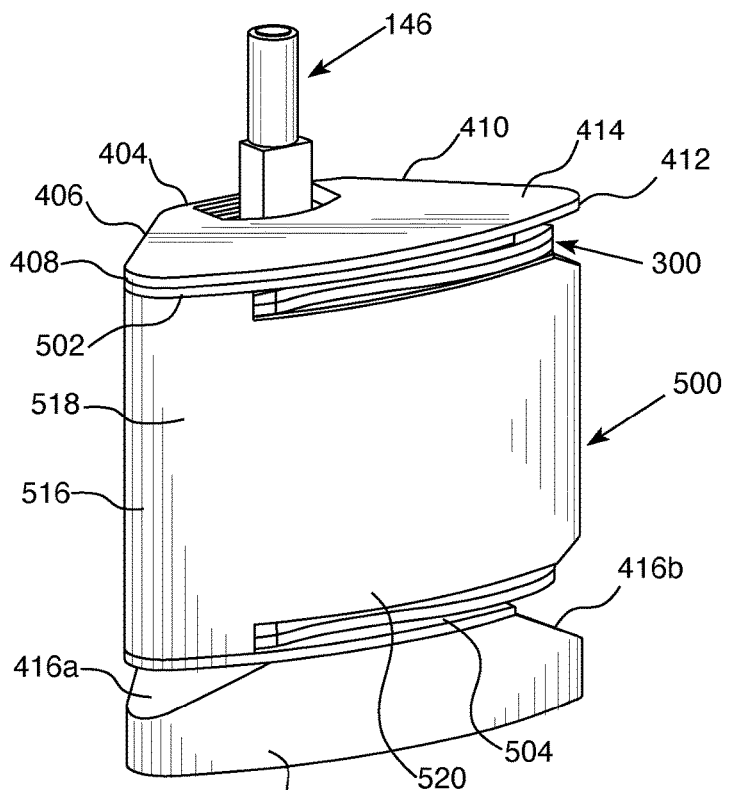
FIG. 19 is a front perspective view of a housing frame and a housing insert of a second example of the dispenser of the present disclosure with the door closed, wherein the housing insert is housing flossers.
Figure 20:
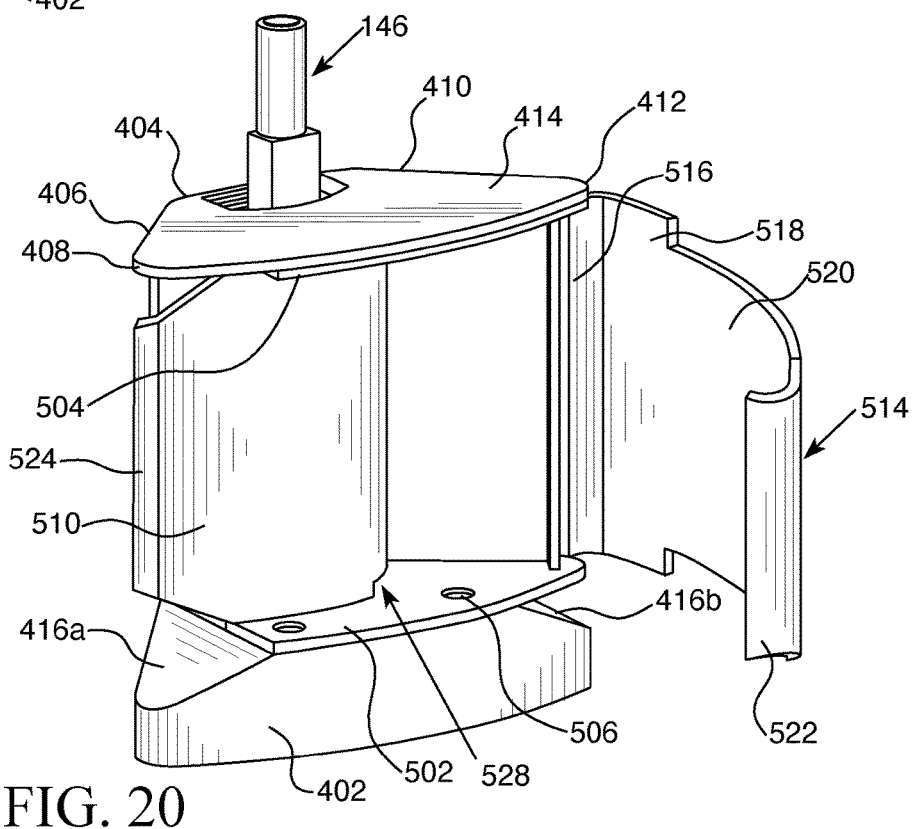
FIG. 20 is a front perspective view of the housing frame and housing insert of the dispenser of FIG. 19 with the door of the housing insert open.

In another embodiment, housing 100 can be generally comprised of housing frame 400, housing insert 500, which has door 134, and multi-state actuator 146, as illustrated in FIG. 20. As with above, housing insert 500 and door 134 can define an interior space, such as internal cavity, that is structured and configured to house flossers 300 in a stacked orientation for individual removal, as illustrated in FIG. 19. More specifically, housing frame 400 can have an external shape similar to a trapezoid and can include front face 402, back face 404, first side 406 having first front edge 408, second side 410 having second front edge 112, top 414, and bottom (not illustrated), and housing insert 500 can have an external shape that fits within housing frame 400 and can include top 502, bottom 504, first mounting receivers 506, and second mounting receivers 508. Housing frame 400 can be mirrored about a central vertical plane so that housing insert 500 can be inserted upright or upside down to be used in the right-handed or the left-handed position.

Figure 7:
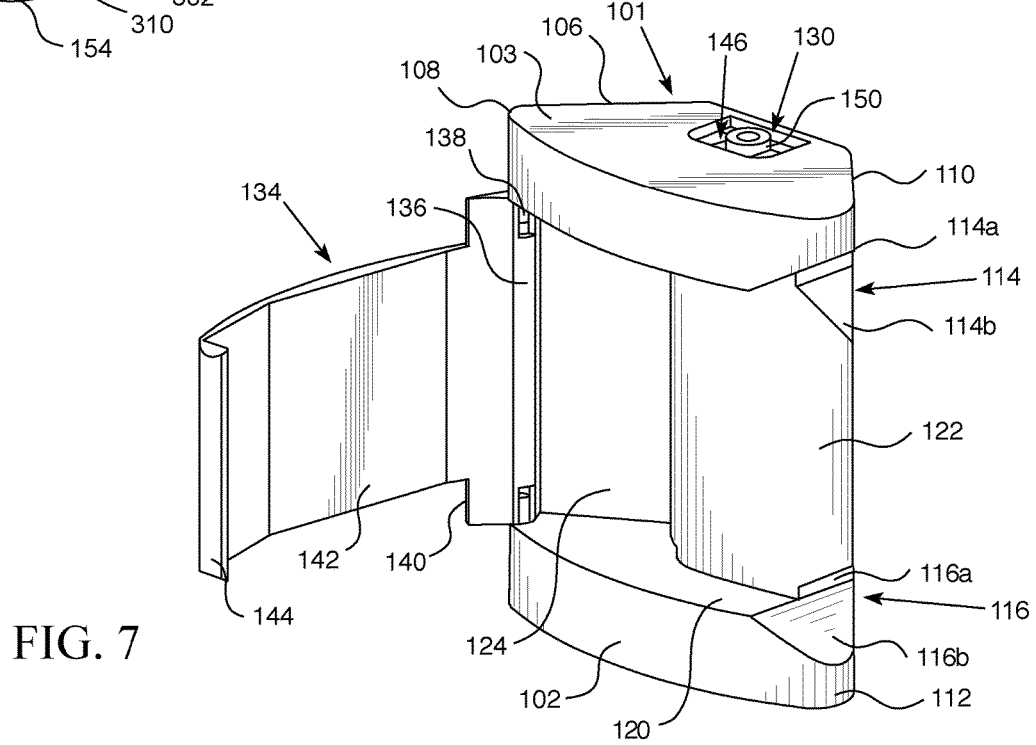
FIG. 7 is a front perspective view of the housing with the door open.
Figure 8:
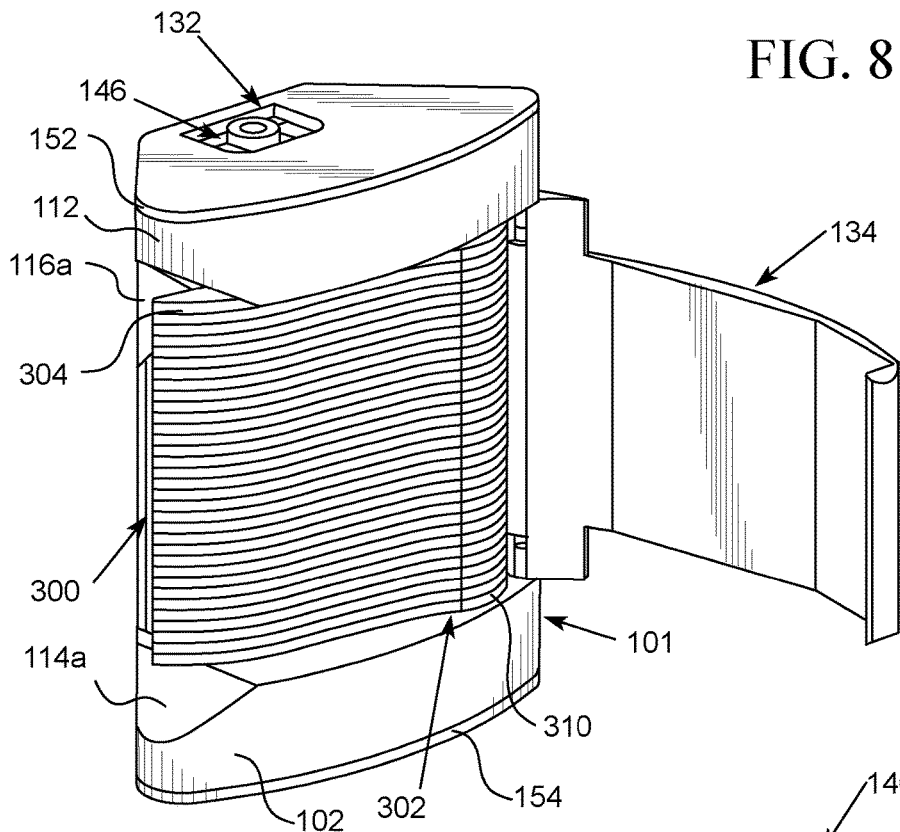
FIG. 8 is a front perspective view of the housing with the door open, wherein the dispenser is housing flossers and has a cap and a base attached.
Figure 21:
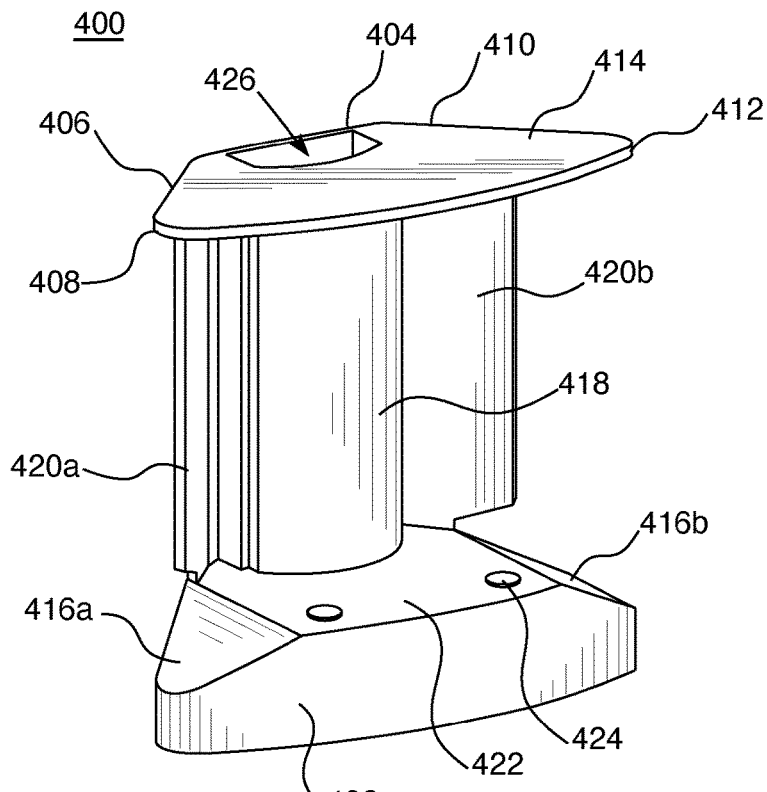
FIG. 21 is a front perspective view of the housing frame of the dispenser of FIG. 19.

Front face 102/402 can be relatively smooth, slightly curved outward, and can be primarily open to an internal cavity so that flossers 300 can easily be loaded into dispensing body 101, as illustrated in FIGS. 7-8, or so that housing insert 500 can be inserted into the cavity of housing frame 400, wherein the housing frame has an internal cavity for flossers 300 or other individual products to be easily loaded into housing 100. For example, front face 102 of dispensing body 101 may have evenly distributed top and bottom solid portions with a central portion open to the internal cavity of the dispensing body 101, such that the dispensing body is mirrored about a central horizontal plane, as illustrated in FIG. 7. In another example, front face 402 of housing frame 400 may have unevenly distributed top and bottom portions (for example, a much taller bottom portion in relation to the top portion) with a central portion open to the internal cavity of the housing frame, such that this configuration is intended primarily to be used in an upright configuration and not flipped upside down, as illustrated in FIG. 21.

Figure 9:
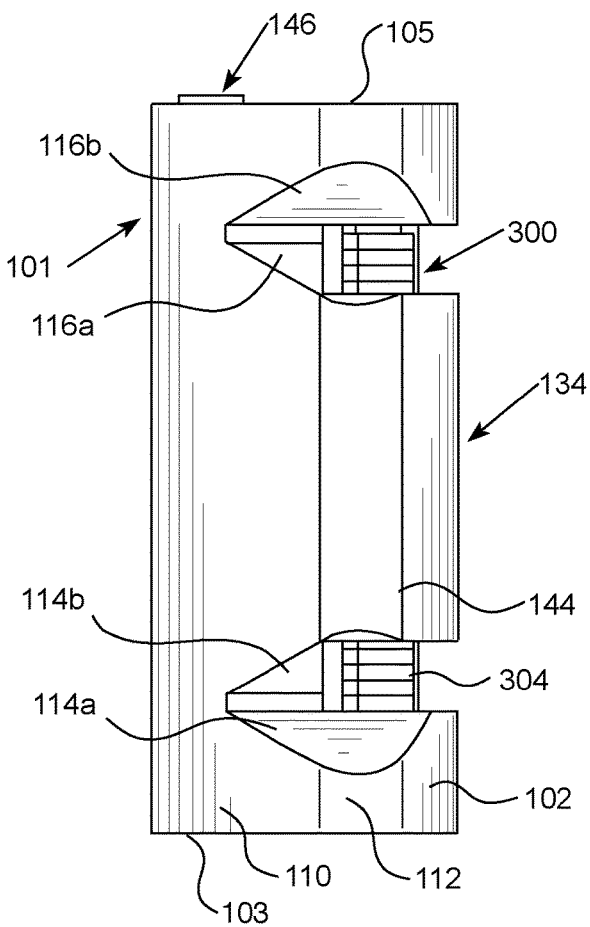
FIG. 9 is a side view of the housing with the door closed, wherein the dispenser is housing flossers.

As will be described herein, door 134 can cover a portion or a majority of the internal cavity of front face 102, as illustrated in FIGS. 6 and 9, such that the open nature of the front face does not result in flossers 300 inadvertently falling out of dispensing body 101. Alternatively, door 514 may cover a portion or a majority of the internal cavity of housing insert 500, as illustrated in FIG. 19, such that the open nature of the housing insert does not result in flossers 300 inadvertently falling out of the insert.

Back face 104/404 can also be relatively smooth, as illustrated in FIG. 10, and can provide a mounting surface onto which additional components attach. For example, mounting feature 1100 can be attached to back face 104/404 to enable flosser dispenser to mount to a wall, as illustrated in in FIG. 11. Mounting hardware can be comprised of a suction cup, poster tape, screws, prongs for inserting into an electrical outlet, a magnet, etc. In another example, a storage feature, such as a toothbrush holder 1200, can extend out the back of the device to enable flosser dispenser to replace common toothbrush storage in a bathroom, as illustrated in FIG. 12. However, the storage feature illustrated in FIG. 12 could also retain other items such as, but not limited to, pencils/pens, business cards, or used flossers. Further, instead of having an open top, the storage feature could be enclosed and could be a liquid soap dispenser or any other kind of liquid pump dispenser. Another item that can extend out the back of the device is a kick stand to assist with refilling by allowing housing 100 to lean backwards without tipping over.

Top 103/414 can be relatively smooth and flat and can include top activation mechanism cavity 130/426 inside which multi-state actuator 146 can be located, as illustrated in FIGS. 5-7 and 19-20. Bottom 105 can also be relatively smooth and flat and, in one embodiment, can include bottom activation mechanism cavity 132 inside which multi-state actuator 146 can be located, as illustrated in FIGS. 8-10. In some embodiments, top 103 and/or bottom 105 of dispensing body 101 and similarly, bottom of housing frame 400, can have feet to increase the friction coefficient, prevent sliding, and make it easier for housing 100 to stay in place on a countertop or other surface when a user is removing flossers 300. Feet may be a plurality of sticky points or one single piece that covers a portion or all of bottom 105. Further, if housing 100 includes base 154, as described further below, the bottom surface of base may include the feet instead of bottom 105, since base will cover the bottom (or top 103, when the dispenser is configured in the left-handed configuration). Further, to prevent tipping, bottom 105, top 103, and/or base 154 may have added weights.

Figure 22:
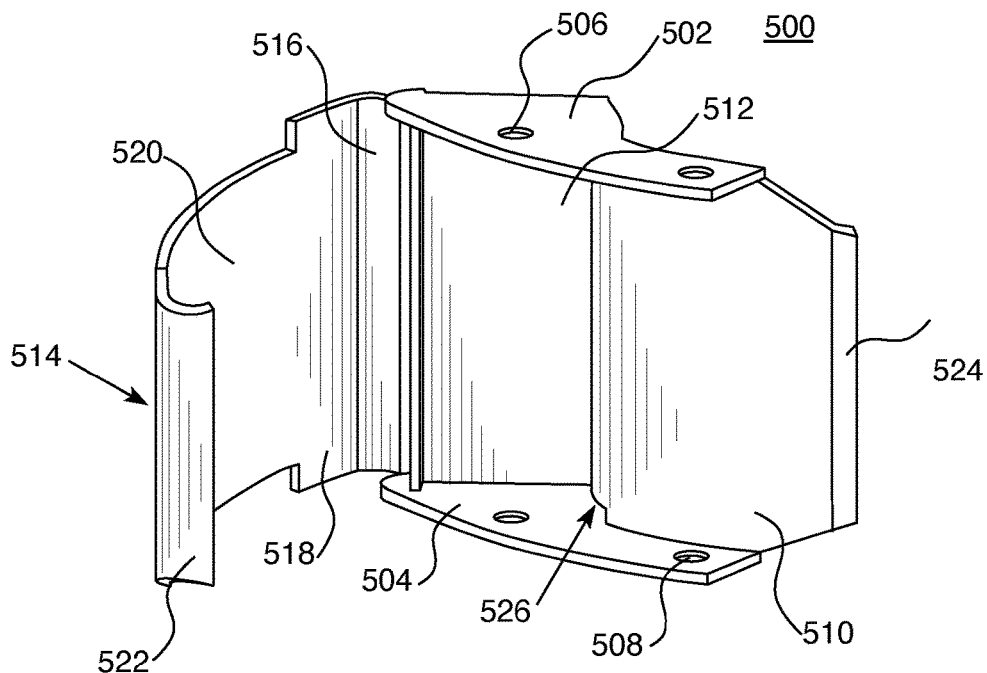
FIG. 22 is a front perspective view of the housing insert of the dispenser of FIG. 19.

First side 106/406 and second side 110/410 can connect front face 102/402 to back face 104/404 at 45-degree angles, as illustrated in FIGS. 5-8, 15-16, and 19-21. This enables flosser dispenser to be easily stored in a corner of a countertop such as, but not limited to, in a bathroom. First side 106/406 as described above, can have first front edge 108/408. As illustrated in FIG. 7, door 134 can attach along first front edge 108. As illustrated in FIG. 22, door 514 may, alternatively, attach to housing insert 500. Second side 110/410, as described above, can have second front edge 112/412. In some embodiments, second front edge 112 can have upper wedge cutout 114 and lower wedge cutout 116, as illustrated in FIG. 7, which expose handles 304 of flossers 300, as illustrated in FIGS. 8-9 and 11-12. Alternatively, first front edge 408 and second front edge 412 may each have a lower wedge cutout 416a, 416b instead of an upper and a lower wedge cutout, as illustrated in FIG. 21, which exposes handles 304 of flossers 300, as illustrated in FIG. 19.

In some embodiments, first side 106 and second side 110 continue down the length of their sides and are only interrupted by upper wedge cutout 114 and lower wedge cutout 116. In other embodiments, first side 406 and second side 410 have first and second side walls 420a, 420b that cover a portion of each side so that housing insert 500 has space for insertion into housing frame 400. More specifically, each of first side wall 420a and second side wall 420b can project from back face 404 toward front face 402 along the same plane as first side 406 and second side 410, respectively, and their front portions can be located over first lower wedge cutouts 416a and second lower wedge cutouts 416b, respectively. For example, first side wall 420a and second side wall 420b may each have an overhang over lower wedge cutouts 416a/b, such that, starting at back face 404 and moving toward front face 402, the side walls run from top 414 of housing frame 400 to floor 422 of housing frame 400 until the walls reach the lower wedge cutouts, at which point the bottom edges of the walls angle upward, as illustrated in FIG. 21.

The upper and/or lower wedge cutouts can be any shape such as, but not limited to, a traditional pyramidal wedge shape, a rectangular cuboid, or a cube and may be mirror images of each other. In some embodiments, upper wedge cutout 114 and lower wedge cutout 116/416a/b are approximately 55-degree angle wedges, as illustrated in FIGS. 9 and 21, although they may be greater or smaller angles.

Upper wedge cutout 114 can be located along second front edge 112 at the intersection of the second front edge and the top of the open area of front face 102, as illustrated in FIG. 7. More specifically, upper wedge cutout 114 may be comprised of upper wedge top portion 114a and upper wedge bottom portion 114b and may be horizontally aligned with top interior surface 118 (i.e., a ceiling) such that the upper wedge top portion may be above the plane of the top interior surface and closer to a top exterior surface of dispensing body 101, and the upper wedge bottom portion may be below the plane of the top interior surface and closer to the horizontal center line of the dispensing body, as illustrated in FIG. 9.

Similar to upper wedge cutout 114, lower wedge cutouts 116/416a/b are also located along second front edge 112/412, as well as potentially along first front edge 408, but are at the intersection of the second front edge/first front edge and the bottom of the open area of front face 102/402, as illustrated in FIGS. 7 and 21. More specifically, in some embodiments, lower wedge cutout 116 may be comprised of lower wedge top portion 116a and lower wedge bottom portion 116b. Alternatively, lower wedge cutouts 416a/b may be comprised of only a lower wedge bottom portion. In either version, the lower wedge bottom portion of lower wedge cutout(s) 116, 416a/b may be below the plane of the bottom interior surface and closer to a bottom exterior surface of the dispensing body, as illustrated in FIGS. 9 and 21. In cases including a lower wedge upper portion, the lower wedge cutout 116 may be horizontally centered on bottom interior surface 120 (i.e., a floor) such that the lower wedge top portion, if included, may be above the plane of the bottom interior surface and closer to the horizontal center plane of dispensing body 101.

In embodiments including housing insert 500, the insert may include a relatively smooth and flat top 502 and a relatively smooth and flat bottom 504. Top 502 can include one or more first mounting receivers 506. First mounting receivers 506 can be cavities in top 502 that are complete apertures, such that an object can pass from one side of the top through a receiver and to the other side of the top. Alternatively, first mounting receivers 506 can be recesses on the top surface of top 502, such that an object can rest inside a recess but will not pass all the way through the top to the interior cavity of housing insert 500. In some embodiments, housing insert 500 includes two first mounting receivers 506 that are complete apertures, as illustrated in FIG. 22.

Similar to top 502, bottom 504 can include one or more second mounting receivers 508. Second mounting receivers 508, like first mounting receivers 506, can be cavities in bottom 504 that are complete apertures, such that an object can pass from one side of the bottom through a receiver and to the other side of the bottom. Alternatively, second mounting receivers 508 can be recesses on the bottom surface of bottom 504, such that an object can rest inside a recess but will not pass all the way through the bottom to the interior cavity of housing insert 500. In some embodiments, housing insert 500 includes two second mounting receivers 508 that are complete apertures, as illustrated in FIG. 22.

In some embodiments, housing 100 may further be comprised of a cap and a base that are located on the top and bottom of the dispenser, respectively (although, as noted below, "top" and "bottom" may be relative due to the ability of the dispenser to operate in either of the right- or left-handed configurations). More specifically, cap 152 and base 154 may be removable and may be placed on either top 103 or bottom 105, depending on whether the dispenser is in the right- or left-handed configuration. For example, in the right-handed configuration, cap 152 can be placed on top 103, and base 154 can be placed on bottom 105. In the left-handed configuration, the opposite is true: cap 152 can be placed on bottom 105, and base 154 can be placed on top 103. In some embodiments, cap 152 can have an opening structured and configured to retain latch base 148 while allowing latch extension 150 to protrude through the opening.

Since both cap 152 and base 154 are removable, they can incorporate a securing mechanism such as a rib(s), that enables them to stay in place once attached. For example, cap 152 and base 154 may include a rib that runs along the interior perimeter, and top 103 and bottom 105 may include a track that runs along a corresponding region of the exterior perimeter of the top and bottom. Therefore, the interior rib of cap 152 or base 154 can align inside the track of top 103 or bottom 105 to hold the cap and base in place. Further, cap 152 and base 154 may include one or more minor cutouts along their edge (for example, a front corner) to enable a user to more easily remove them from the top and bottom of housing 100.

In addition to the exterior features of dispensing body 101 described above, additional interior features may include top interior surface 118, bottom interior surface 120, interior back wall 122, interior side wall 124, top layer interior groove 126, and bottom layer interior groove 128, as illustrated in FIGS. 13-14. Top interior surface 118, bottom interior surface 120, interior back wall 122, and interior side wall 124 can be structured and configured to define a space wherein flossers 300 can be housed in a stacked orientation, as illustrated in FIGS. 8 and 15-16. More specifically, interior back wall 122 can be shaped to substantially align with head 302 and handle 304 of flosser 300 on the short prong 308 side of the flosser, and interior side wall 124 can be shaped to substantially align with head 302, such that floss 306 runs parallel to the interior side wall, as illustrated in FIG. 15.

Similar to dispensing body 101, housing frame 400 and housing insert 500 may have additional features to the exterior features described above. For example, additional interior features of the housing frame 400 may include back wall 418, floor 422, and mounting protrusions 424, and additional interior features of the housing insert 500 may include interior back wall 510, interior side wall 512, bottom layer interior groove 526, and top layer interior groove 528, as illustrated in FIGS. 20 and 22. As with dispensing body 101, top 502, bottom 504, interior back walls 510, and interior side wall 512 of housing frame 500 can be structured and configured to define a space wherein flossers 400 can be housed in a stacked orientation, as illustrated in FIG. 19. More specifically, interior back wall 510 of housing insert 500 can be shaped to substantially align with head 302 and handle 304 of flosser 300 on the short prong 308 side of the flosser, and interior side wall 512 can be shaped to substantially align with head 302, such that floss 306 runs parallel to the interior side wall.

The number of flossers 300 that could be housed within the flosser dispenser can vary. For example, a standard flosser dispenser may be sized to house 30 flossers, whereas a miniaturized version may be sized to house 10 flossers and may more easily fit in, for example, the center console of a car, within a purse, or within a small bag and, therefore, function as an on-the-go option for a flosser dispenser.

It is anticipated that flossers 300 are gravity-fed (i.e., as the bottom-most flosser is removed, the next flosser will be forced into the bottommost position due to the forces of gravity) and, therefore, do not require additional mechanics, such as spring mechanics, to progress the next flosser into dispensing position. However, an internal cavity spring or any other compressible material may be included, which could help prevent jamming of flossers by holding them in place more securely than what is allowed by the combination of gravity and space within housing 100.

Top interior surface 118/top 502, and bottom interior surface 120/bottom 504, can both be flat surfaces upon which flossers 300 can stack. The surfaces of top interior surface 118/top 502 and bottom interior surface 120/bottom 504 can be horizontal, as illustrated in FIGS. 9, 14, 20 and 22. Alternatively, top interior surface 118/top 502 and bottom interior surface 120/bottom 504 can be at slight angles so as to retain flossers 300 in their stacked configuration when door 134/514 is opened. Further, the shape of top and bottom interior surfaces 118, 120 or top and bottom 502, 504 can reflect the overall outline of flossers 300 and can be defined by interior back wall 122/510 and interior side wall 124/512, as illustrated in FIGS. 13 and 22.

More specifically, starting near second front edge 112 of dispensing body 101, interior back wall 122 runs roughly parallel to front face 102. At around the center point of front face 102, interior back wall 122 curves back toward back face 104 so as to create a larger area in which flosser head 302 can fit. Interior back wall 122 then terminates near a back corner of first side 106 and in contact with interior side wall 124, which runs roughly parallel to the first side. Interior side wall 124 can therefore run from first front edge 108 and along first side 106 to the back corner of the first side.

Similarly, interior back wall 510 of housing insert 500, in relation to housing frame 400 when the housing insert is inserted in the frame, can run roughly parallel to front face 402, as illustrated in FIG. 20. At around a center point of front face 402, interior back wall 510 can curve toward back face 404 so as to create a larger area in which flosser head 302 can fit. Since housing insert 500 can be placed into housing frame 400 in either the right- or left-handed configuration, interior back wall 510 can then terminate near a back corner of either first side 406 (if the insert is in a right-handed configuration) or second side 410 (if the insert is in a left-handed configuration) and in contact with interior side wall 512, which runs roughly parallel to either first side wall 410a (if insert is in the right-handed configuration) or second side wall 420b (if insert is in the left-handed configuration). Interior side wall 512 can therefore run, in the right-handed configuration and in relation to housing frame 400, from the first front edge 408 and along first side 406 and first side wall 420a to the back corner of the first side. In the left-handed configuration and in relation to housing frame 400, interior side wall 512 can run from the second front edge 412, along second side 410 and second side wall 420b, and to the back corner of the second side.

At the intersection of interior back wall 122/510, interior side wall 124/512, and top interior surface 118/top 502 is where top layer interior groove 126/528 begins. Similarly, at the intersection of interior back wall 122/510, interior side wall 124/512, and bottom interior surface 120/bottom 504 is where bottom layer interior groove 128/526 begins. More specifically, each of top and bottom layer interior grooves 126/528, 128/526 cut into interior back wall 122/510, as illustrated in FIGS. 13-14, 20 and 22, so as to create a curved groove in the back wall near short prong 308 of flosser head 302. Therefore, top layer interior groove 126/528 and bottom layer interior groove 128/526 are mirror images of each other about the center horizontal plane (i.e., the x-axis).

Figure 17:
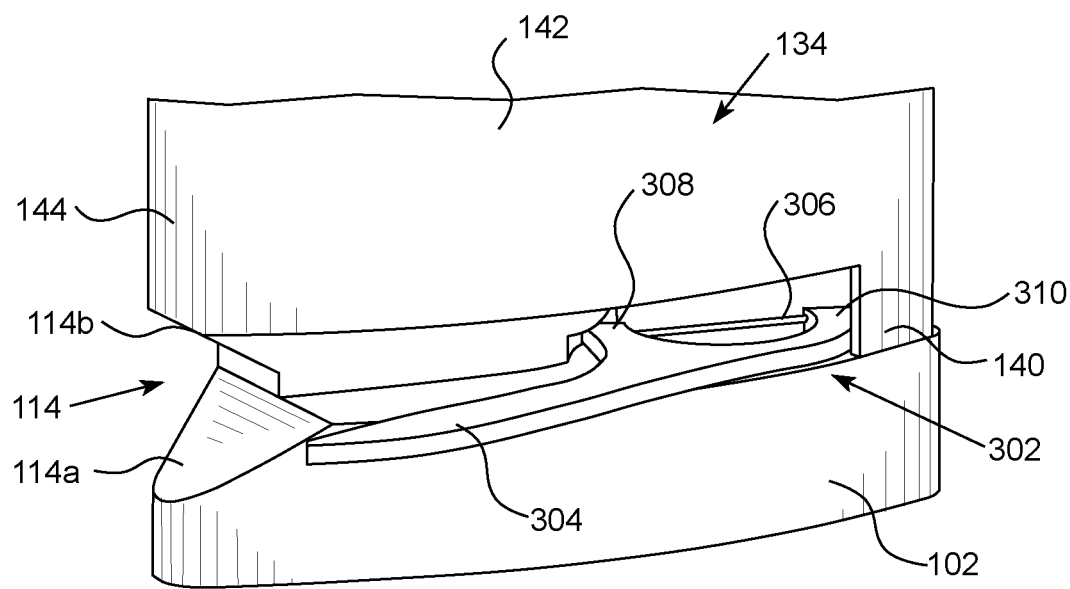
FIG. 17 is a front perspective view of a bottom portion of the housing with a flosser in the pivoting position.

The depth and length of interior grooves 126/528, 128/526 are such that they enable short prong 308 to rotate from a stored position through the grooves, as illustrated in FIGS. 16-17. While the depth and length have a minimum measurement to enable rotation of flosser 300, there is no known maximum and the grooves 126/528, 128/526 can be deeper and longer than needed to accommodate the length of short prong 308. Further, the height of interior grooves 126/528, 128/526 is greater than the height of a single flosser 300 and less than the height of two flossers, such that only one flosser at a time can fit into either of the interior grooves. The configuration of top and bottom interior grooves 126/528, 128/526 therefore enable a user to extract a single flosser 300 at a time when housing 100 is in either a right- or left-handed configuration. For example, as illustrated in FIGS. 15-16, a single flosser (indicated with phantom lines in FIGS. 15-16) in the bottom most position can align with, and pivot through, the top layer interior groove 128/526 (also indicated with phantom lines in FIGS. 15-16) when the dispenser is in the left-handed configuration.

As mentioned above, housing frame 400 creates a pocket for housing insert 500. More specifically, housing frame 400 can have a cavity defined by back wall 418, first side wall 420a, second side wall 420b, floor 422, ceiling (not numbered), and a plurality of mounting protrusions 424 on the floor and the ceiling. Therefore, housing frame 400 has additional interior features not described in dispensing body 101. For example, housing frame 400 can include back wall 418, which can be located between first side wall 420a and second side wall 420b and centered on back face 404 of the frame. In some embodiments, back wall 418 can have a convex surface such that its edges begin near the back corners of first side 406 and second side 410 and curve into the interior cavity or pocket of housing frame 400, as illustrated in FIG. 21. The shape of back wall 418 is intended to provide space for activation mechanism cavity 426 and to align with the shape of the back of housing insert 500 such that the insert can fit within the pocket of housing frame 400 and nestle against back wall 418 and between first and second side walls 420a/b, with interior side wall 512 fitting up against either the first side wall (if in the right-handed configuration) or the second side wall (if in the left-handed configuration).

In addition to back wall 418, housing frame 400 can include floor 422, ceiling (not numbered), and mounting protrusions 424 to assist with insertion of housing insert into the frame. More specifically, floor 422 can be parallel to bottom (not numbered) of housing frame 400 and can be located within the pocket. Floor 422 and ceiling can be relatively smooth and flat, similar to bottom 504 and top 502 of housing insert 500, to enable the insert to slide smoothly into the pocket of housing frame 400. Further, aligning with first and second mounting receivers 506, 508 of housing insert 500 can be mounting protrusions 424, which may be located on floor 422 and ceiling. Mounting protrusions 424 act as a locking device for housing insert 500 such that first and second mounting receivers 506, 508 can surround and encapsulate the protrusions when the insert is placed in the pocket of housing frame 400 to help retain the insert in the frame.

More specifically, as illustrated in FIG. 21, floor 422 may have mounting protrusions 424 that have a comparable shape to second mounting receivers 508, such that the mounting protrusions can fit within the external bounds of the mounting receivers when housing insert 500 is placed inside housing frame 400. As described above, in some embodiments, second mounting receivers 508 may have complete apertures in which case mounting protrusions 424 can have any desired height such that they may insert into the receivers and protrude all the way through, partially through, or may be flush with the internal surface of bottom 504 of housing insert 500. In other embodiments, second mounting receivers 508 may be recesses in which case mounting protrusions 424 are limited in height such that they may insert into the receivers and only protrude so far as the height of the recess.

Similar to floor 422, ceiling may have mounting protrusions 424 that have a comparable shape to first mounting receivers 506, such that the protrusions can fit within the external bounds of the receivers. As with above, the height of the aperture/recess of first mounting receivers 506 put a limit on the height of mounting protrusions 424 on the ceiling. Complete apertures do not restrict the height of mounting protrusions 424 while partial recesses do limit the height.

In some cases, first and second mounting receivers 506, 508 are the same shape and size, and mounting protrusions 424 on the ceiling and floor 422 are the same shape and size. This enables housing insert 500 to be ambidextrous. More specifically, housing insert 500 can be inserted into housing frame 400 in the right- or left-handed configuration because the pairings between mounting receivers 506, 508 and ceiling and floor mounting protrusions 424 are interchangeable.

In addition to exterior and interior features, dispensing body 101 may also be comprised of an opening or cavity in which an activation mechanism for cover 200 can be located. For example, an activation mechanism cavity, such as top activation mechanism cavity 130 and bottom activation mechanism cavity 132 in dispensing body 101 or activation mechanism cavity 426 in housing frame 400, may house multi-state actuator 146, such as a touch latch assembly, such that the multi-state actuator is encompassed within a surrounding space, as illustrated in FIGS. 5-9 and 19-21. In some embodiments, top activation mechanism cavity 130 and bottom activation mechanism cavity 132 may be two distinct cavities in dispensing body 101 such that there is a solid layer between the two cavities. In other embodiments, top and bottom activation mechanism cavities 130, 132 may be one continuous cavity that is a through hole in dispensing body 101. In additional embodiments where housing frame 400 is used only in an upright position due to the ambidextrous nature of housing insert 500, activation mechanism cavity 426 may be a cavity having an opening only on top 414 of the housing frame.

Figure 23:
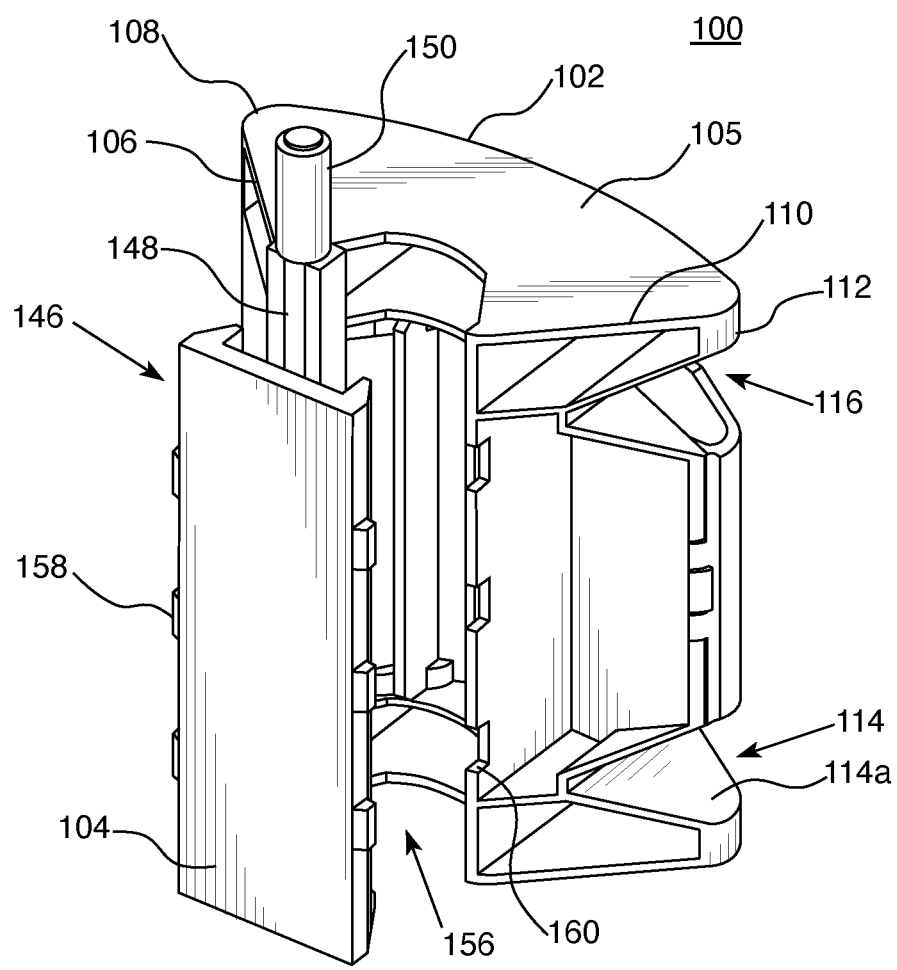
FIG. 23 is a back perspective view of another example of a housing of the dispenser of the present disclosure with the door closed and the multi-state actuator separated from the housing.

However, while top and bottom activation mechanism cavities 130, 132 in dispensing body 101 or activation mechanism cavity 426 in housing frame 400 are illustrated as being fully encompassed within dispensing body/housing frame, they do not necessarily need to be fully encompassed. For example, activation mechanism cavities 130, 132, 426 may be insets along back face 104/404, wherein the wall of back face is not completely flat but has a recess 156 to accept multi-state actuator 146 from the back instead of the top and/or bottom, as illustrated in FIG. 23. In the case of insets, multi-state actuator 146 may be attached to insets via a magnet, snap fit, screw, ribs/tracks, adhesive, etc.

As described above, one embodiment of the flosser dispenser includes a cap and base for housing 100. One of the benefits of cap 152 and base 154 is that they can operate to retain multi-state actuator 146 within top and bottom activation mechanism cavities 130, 132. Therefore, if a user wishes to switch the flosser dispenser from a right-handed configuration to a left-handed configuration, the user can remove cover 200 from housing 100; remove cap 152 and base 154 from top 103 and bottom 105, respectively, by, for example, hooking a fingernail, flosser, coin, or other tool under the minor cutouts and pulling on them; remove multi-state actuator 146 from top activation mechanism cavity 130; flip housing 100 upside down; attach base 154 to top 103; insert multi-state actuator 146 into bottom activation mechanism cavity 132; attach top 152 to bottom 105; and place cover 200 back over housing 100. The reverse is true if a user wishes to switch the flosser dispenser from a left-handed configuration to a right-handed configuration.

In addition to the features described above for dispensing body 101 or housing frame 400 and housing insert 500, housing 100 can include door 134/514. Door 134, as described above and illustrated in FIGS. 5-8, can connect at or along first front edge 108 and can be comprised of a first connection component, which can attach to a door connection on dispensing body 101, and a door cover component. Connection component can be, for example, door hinge 136, which is located along a first side edge of door 134, and door connection can be hinge pins 138, which are located near first front edge 108 of dispensing body 101, as illustrated in FIGS. 7-8. Therefore, door hinge 136 can attach to hinge pins 138, and door 134 can rotate around this connection point so that the door swings open and closed for loading of products, such as flossers 300, as illustrated in FIGS. 5-8.

In some embodiments, door 134 may have a second connection component at or along a second side edge of the door that attaches to, or makes contact with, dispensing body 101 near, for example, second front edge 112. This second connection component may be door handle 144, although the door handle may also be a standalone component and not necessarily a second connection component. Door handle 144 may be a curved or hooked extension at the outermost part of door 134 and may latch or lock onto dispensing body 101 or, alternatively, the door handle may rest against the dispensing body and, therefore, be held in place when cover 200 is placed over the dispensing body. In another example, first and second connection components may snap onto dispensing body 101, for example, on front face 102 or at first and second front edges 108, 112.

Similar connection points are envisioned for embodiments with housing frame 400 and housing insert 500. More specifically, door 514, as described above and illustrated in FIGS. 20 and 22, can connect at or along the front edge of side wall 512 of housing insert 500 and can be comprised of a first connection component, which can attach to a door connection on the housing insert, and a door cover component. Connection component can be, for example, door hinge 516, which can be located along a first side edge of door 514, and door connection can be hinge pins (not numbered), which are located near front corners of side wall 512 of housing insert 500. Therefore, door hinge 516 can attach to hinge pins, and door 514 can rotate around this connection point so that the door swings open and closed for loading of flossers 300.

The second connection component for door 514 can be at or along a second side edge of the door that attaches to, or makes contact with, housing insert 500 near, for example, door jamb 524 located at the outermost portion of back wall 510 of the insert. This second connection component may be door handle 522, although the door handle may also be a standalone component and not necessarily a second connection component. Door handle 522 may be a curved or hooked extension at the outermost part of door 514 and may latch or lock onto door jamb 524 of housing insert 500 or, alternatively, the door handle may rest against the door jamb or insert and, therefore, be held in place when cover 200 is placed over the housing frame and housing insert. In another example, first and second connection components may snap onto housing insert 500, for example, on top 502 and bottom 504 or at front edge of side wall 512 and door jamb 524. While the above-described connection means have been described, other connection means are envisioned.

For example, in another embodiment, door 134/514 may have a second connection component at or along a first side edge of door hinge 136/516 and along first front edge 108 or front edge of side wall 512. For example, an inner surface of first front edge 108/front edge of side wall 512 may have an elongate latching rib running up and down, and an outer surface of hinge 136/516 on door 134/514 may have a corresponding latching rib running up and down such that when the door is rotated into a closed position, the latching rib on the hinge flexes and snaps over and past the latching rib on the first front edge/front edge of side wall (which may alternatively, or additionally, flex) and into a locked position. This locked position of the latching ribs prevents door 134/514 from inadvertently opening if cover 200 is removed from housing 100, and the housing is tilted forward.

As described above, another component of door 134/514 can be a door cover component that covers a portion or a majority of front face 102 and/or internal cavity of housing insert 500 thereby helping to retain flossers 300 or other products in their desired stacked configuration, prevent flossers/products from inadvertently falling out of dispensing body 101 or housing insert 500, and, in some embodiments, prevent more than one flosser or product from being removed at a time when multi-state actuator 146 (or, more specifically, latch extension 150) is in the extended position. For example, the cover component can include vertical side portion 140/518 and horizontal portion 142/520, as illustrated in FIGS. 5-6, 20, and 22.

Vertical side portion 140/518 can extend completely from top to bottom of the open area of front face 102 and/or front of housing insert 500 so that at least a portion of all products, such as flossers 300, are covered by the vertical side portion, as illustrated in FIGS. 6 and 19. Vertical side portion 140/518 can be positioned next to door hinge 136/516 and, therefore, near first front edge 108 or front edge of side wall 512 so that it covers at least a portion of flosser heads 302. This positioning allows vertical side portion 140/518 to prevent flossers 300 from inadvertently falling out of dispensing body 101 or housing insert 500, and it allows only the lowest positioned flosser to be rotated through the interior groove 126/518 or 128/526 to be removed from housing 100. For example, in a left-handed configuration, the flosser directly in contact with top interior surface 118 or top 502 (i.e., the flosser that is at the bottom of the stacked group of flossers) is the only flosser that can rotate through top layer interior groove 126/528, as illustrated in FIGS. 15-17. The opposite is also true in a right-handed configuration, wherein the flosser directly in contact with bottom interior surface 120 or bottom 504 is the only flosser that can rotate through bottom layer interior groove 128/526.

Horizontal portion 142/520 can extend horizontally from a central part of the interior edge of vertical side portion 140/518. For example, horizontal portion 142 can extend across the open area of front face 102 and toward second front edge 112. Horizontal portion 142 can terminate either in the open area of front face 102 or it can extend all the way across and terminate at second front edge 112, as illustrated in FIGS. 5-6. For example, horizontal portion 142 may terminate at door handle 144. Alternatively, horizontal portion 520 can extend across front of housing insert 500 and toward door handle 522 and/or door jamb 524. Similar to above, horizontal portion 520 can terminate either in the front open area of housing insert 500 or it can extend all the way across and terminate at door jamb 524.

Additionally, the height of horizontal portion 142/520 is less than that of vertical portion 140/518 and of the open area of front face 102/front of housing insert 500. For example, horizontal portion 142/520 may have a height that is at least two flosser heights less than the height of the open area of front face 102/front of housing insert 500, and the horizontal portion may be centered on the front, open area so as to allow a space large enough at the top and bottom for a flosser to rotate through. In some embodiments, horizontal portion 142/520 may have an even smaller height such that a plurality of flosser handles 304 are visible at the top and bottom of the stacked configuration when door 134/514 is closed and a full set of flossers have been loaded, as illustrated in FIGS. 6 and 19.

As illustrated in FIGS. 15-16, the combination of door 134/514, interior back wall 122/510, and interior side wall 124/512 can define a space in which a stack of flossers 300 can fit on their top and bottom faces (which face is dependent upon whether the device is in the right- or left-handed configuration). Additionally, the distance between the edges of flossers 300 and each of door 134/514, back wall 122/510, and side wall 124/512 are minimal so as to prevent flossers 300 from excess movement that would cause them to rotate into a non-stacked configuration within dispensing body 101 or housing insert 500.

As described above, housing 100 can also include multi-state actuator 146, such as touch latch assembly or a bi-state actuator, that has at least a portion, such as latch extension 150, that is structured to alternate between various states, including at least a compressed position and an extended position. Multi-state actuator 146, as briefly described above, can be a spring activated bi-state actuator such that, in a first, closed state, the actuator is compressed into a shorter height than its height in a second, open state where the actuator is expanded in height. In some embodiments, pushing down on multi-state actuator 146 causes it to move between these two states. In other embodiments, activation of multi-state actuator 146 may occur using functions such as, but not limited to, motion activation, voice activation, a push button located on top of cover 200, etc. Therefore, pushing down on multi-state actuator 146 or otherwise activating the multi-state actuator can move it from the first, closed state to the second, open state. Further, pushing down on multi-state actuator 146 or otherwise activating the multi-state actuator when it is in the second, open state will move it back to the first, closed state.

More specifically, in some embodiments, multi-state actuator 146 can be a spring activated touch latch assembly and can include at least latch base 148 and latch extension 150. Latch base 148 can house latch extension 150 and can be located, as described above, within top and/or bottom cavities 130, 132, as illustrated in FIGS. 1, 5-8, and 19-20. Latch base 148 can also house a spring (not shown), which can be in line with latch extension 150 such that, when the latch extension is pushed down, it makes contact with the spring and further compresses the spring. The spring then stores energy so that when latch extension 150 is pushed down on again, the spring forces the latch extension to extend upward. As illustrated in FIG. 9, multi-state actuator 146 may extend slightly above bottom 105 of dispensing body 101 when the device is in the left-handed configuration. Similarly, in the right-handed configuration, multi-state actuator 146 may extend slightly above top 103/414. This provides space for multi-state actuator 146 to be compressed slightly from the first, closed state so as to release it into the second, open state. Multi-state actuator 146 can, in some cases, be partially or entirely magnetic or can be comprised of ferromagnetic materials. For example, a top portion of latch extension 150 may be ferromagnetic or may include a magnet while the remainder of multi-state actuator 146 is plastic.

In some embodiments where an activation mechanism cavity is inset along back face 104/404 of housing 100, multi-state actuator 146 may also include an outer back surface that creates a continuation of the back face such that the outer back surface of the multi-state actuator fits into the back face like a puzzle piece. Therefore, the gap in back face 104/404 created by a activation mechanism cavity is therefore filled by the outer back surface of multi-state actuator 146. This ensures that cover 200 can smoothly fit over dispensing body 101 or housing frame 400. Alternatively, instead of multi-state actuator 146 being a continuation of back face 104/404, the entirety of the back face may be part of the multi-state actuator 146, as illustrated in FIG. 23. To enable multi-state actuator 146 to connect to dispensing body 101 or housing frame 400, the multi-state actuator may include connection points 158 that attach to connection points 160 on back face 104/404 or on first side 106/406 and second side 110/410. Connection points 158, 160 may, for example, be connected via magnetism, snap fit, ribs/tracks, adhesive, etc.

Figure 18:
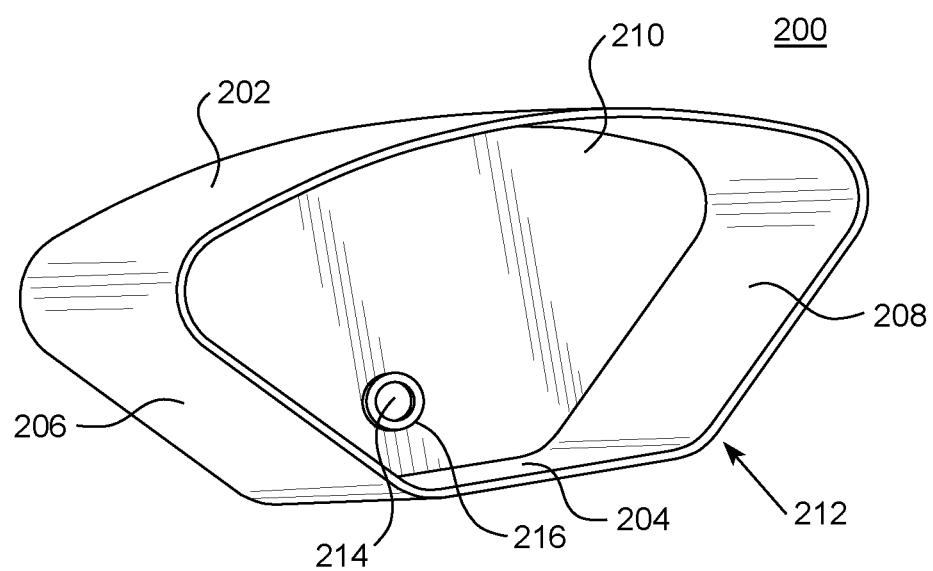
FIG. 18 is a bottom perspective view of the cover of the dispenser.

Cover 200, as described above, is intended to prevent flossers 300 from unsanitary conditions such as splashed or spilled water, etc. It can have a front wall 202, back wall 204, first side 206, second side 208, and top 210, as illustrated in FIG. 2. Cover 200 can have any type of external shape to aid in marketing of the flosser dispenser, as described further below. Further, cover 200 can have open bottom 212, as illustrated in FIG. 18, which enables it to slide over and around housing 100 and which, in combination with the overall shape of the cover, can create a snug fit if the interior shape of cover 200 is substantially equivalent to the exterior shape of housing 100. However, the interior shape of cover 200 does not need to be substantially equivalent to the exterior shape of housing 100, and it may instead merely be larger and of a different shape (i.e., the interior shape of the cover can be larger than the exterior shape of the housing). While the external shape of cover 200 can vary, the cover may fit best if the internal shape is substantially similar to the external shape of housing 100.

The interior surface of cover 200 can be smooth, such that it slides easily over the housing when transitioning between closed and activated configurations and when the cover is removed from the housing. Alternatively, the interior surface of cover 200 may have materials overlaid, embedded, or inset in the surface such as felt or vinyl. In another embodiment, instead of having additional materials added to the interior surface, cover 200 may include ribs incorporated into the mold. These ribs may run longitudinally (for example, from top to bottom) or they may run horizontally (for example, from side to side).

Cover 200, as described above, is removable and can be made of any rigid material such as, but not limited to, plastic, wood, or metal (for example, stainless steel or anodized aluminum). In some embodiments, the bottom portion of front wall 202 can be chamfered near its front edges to enable cover 200 to drag a second flosser back inside housing 100 if the first flosser, when being removed by a user, pulls on the second flosser to move it forward and slightly out of place. Further, front wall 202 can be curved and can have a uniform texture (for example, smooth) so as to make it easy for adding and viewing images on the surface (for example, advertisements, decorative graphics, marketing content, etc.). These can be incorporated into cover 200 itself during the manufacturing process, or they can be added via adhesives, shrink wrap, glue, etc.

Additionally, at least front wall 202 of cover 200 can have enhanced features such as: a dry-erase or chalkboard finish to enable users to draw on the cover; a one-time customizable surface that allows users to permanently paint, draw, or color their dispensers; a digital calendar; a digital screen; a clock; a night light; a photo insert; and a magnetic surface that allows users to attach magnetic objects to the dispenser. In some cases, the external surface of cover 200 may include additional one or more three-dimensional objects that project out from the surface of the cover. In one example, the three-dimensional objects can be cartoon figures that project off the top 210 or front wall 202 or other themed shapes or objects. In another example, the three-dimensional object may be an additional functional feature, such as a conventional floss holder that may project off front wall 202, back wall 204, side walls 206, 208, or top 210.

In some embodiments, the underside of top 210 of cover 200 can be in contact with multi-state actuator 146 in both the compressed position and the extended position. Further, the underside of top 210 can have cover magnet 214, which may be held in place by cover magnet base 216, as illustrated in FIG. 18. As illustrated in FIG. 1, cover magnet 214 can align with multi-state actuator 146 such that if a portion of the multi-state actuator, such as latch extension 150, is magnetic, the cover magnet can ensure that cover 200 stays attached to housing 100 when the flosser dispenser is picked up by the cover.

In other embodiments, cover 200 may have additional features such as, but not limited to, a scent or a scent production mechanism, a solar cell if the cover or housing 100 host electronics (such as a clock, radio, etc.), and it may be configured to generate a sound when it is opened in order to alert the user that the device is open and also to act as a positive reinforcement to encourage users to continue flossing.

Further, flosser dispenser can have additional augmentations to those described above. In one embodiment, flosser dispenser can be partially or entirely transparent (for example: the cover, the door, or a window in either of the cover or door may allow a user to see how many flossers remain). In another embodiment, flosser dispenser may be comprised of two or more dispensers that are connected by a single multi-state actuator (for example, four dispensers may be arranged in a circle with a single multi-state actuator in the center). In a further embodiment, the flosser dispenser may include ingress protection so that the dispenser can be kept in a shower or other area that is frequently splashed by water.

In some embodiments, the disclosed device is structured and configured to dispense objects other than flossers, such as food (in which case the dispenser could be insulated) or other disposable goods. Examples include, but are not limited to, gum, toothbrush heads, makeup remover pads, makeup sponges, coins, cotton swabs, cotton balls, foam toes separators, batteries, soap bars, custom cookies, sponges, bath markers, candy, toilet paper, paper towels, tissues, disposable contacts, razor heads, diapers, detergent pods, bath salt pellets, dry and/or rigid foods (for example, crackers, cookies, dog treats, etc.), powdered pellets (for example, antacids, dietary supplements, mosquito pellets, etc.), individually wrapped items (for example, contact lenses, wet wipes, condoms, tampons, sanitary napkins, disposable nail files, etc.), and elongate objects (for example, pencils, pens, straws, etc.). If combined with ingress protection, some objects, like soap bars and razor heads, could be stored in a shower until they are needed for use, thereby freeing up other storage space in the bathroom and keeping those objects close to the location where they will be needed. In yet another embodiment, the cover of flosser dispenser may, instead of covering dispensing body 101, cover a hidden drawer that is used to hide small objects (i.e., the dispenser is designed to blend into its surroundings and isn't obviously a dispenser).

While flosser dispenser has been described herein as having top and bottom features, these features are not limited to those orientations and, upon rotating the flosser dispenser between right-handed and left-handed configurations, top features may be positioned beneath bottom features and vice versa. The ambidextrous nature of the dispenser enables it to be used easily by both right- and left-handed individuals or placed in locations that are more accessible from one side of the device or another.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A dispenser for dispensing individual products, the dispenser comprising:
    a housing comprising:
    an internal cavity configured to house individual products in a stacked orientation, and
    a multi-state actuator having at least a portion that is structured to alternate between various states, including at least a compressed position and an extended position; and
    a vertically adjustable cover having an open bottom end that is structured and configured to fit over and around the housing, the cover having an interior shape larger than an exterior shape of the housing,
    wherein the underside of a top surface of the cover is in contact with the multi-state actuator in both the compressed position and the extended position.

2. The dispenser of claim 1, wherein
    the housing further comprises an activation mechanism cavity separate from the internal cavity, and
    the multi-state actuator is housed within the activation mechanism cavity.

3. The dispenser of claim 2, the housing further comprising a bottom cavity that is open at a bottom of the housing and is structured and configured to house the multi-state actuator, wherein the activation mechanism cavity and the bottom cavity are one continuous cavity.

4. The dispenser of claim 2, wherein the activation mechanism cavity is inset along a back face of housing.

5. The dispenser of claim 1, wherein
    the housing includes an open area of a front face having at least a portion that is open to the internal cavity of the housing, the multi-state actuator in its compressed position allows the cover to substantially encompass the housing, the multi-state actuator in the extended position causes the cover to expose a portion of the housing such that at least one individual product is exposed, and the housing is structured and configured to allow no more than one individual product to be removed at a time when the multi-state actuator is in the extended position.

6. The dispenser of claim 5, further comprising a door that covers at least a portion of the internal cavity, wherein the door is a separate component than the dispenser cover.

7. The dispenser of claim 6, wherein the door is comprised of
a vertical side portion that extends from a top of the open area of the front face to a bottom of the open area of the front face, therein covering at least a portion of each product in the housing, a horizontal side portion that extends from an interior edge of the vertical side portion across the open area of the front face, wherein the horizontal side portion is centered on the interior edge of the vertical side portion, and a door hinge that enables the door to open and close for loading of products, wherein the horizontal side portion has a height that is less than a height of the open area of a front face.

8. The dispenser of claim 6, wherein
the dispenser houses flossers,
the housing further includes an interior back wall having a bottom layer interior groove aligned with a bottommost flosser, and
the interior groove is sized to enable a portion of the bottommost flosser to rotate from a stored position in the housing through the groove so the bottommost flosser can be removed from the housing.

9. The dispenser of claim 8, wherein
each of the flossers are comprised of
a head having a short prong and a long prong,
a handle attached to the head, and
floss attached between the short prong and the long prong,
the interior back wall aligns with the flossers along the handles and the short prongs,
the bottom layer interior groove aligns with the short prong of the bottommost flosser, and
the housing further comprises an interior side wall that aligns with the flosser heads such that the interior side wall is parallel to the floss, a top interior surface, and a bottom interior surface.

10. The dispenser of claim 8, wherein
the housing further comprises a top layer interior groove that is a mirror image of the bottom layer interior groove,
the dispenser can be used in an upright or upside down position, thereby enabling the dispenser to be configured in a right-handed or left-handed configuration, and
a topmost flosser becomes the bottommost flosser and aligns with the top layer interior groove when the dispenser is in the left-handed position.

11. The dispenser of claim 10, wherein
the housing further comprises an activation mechanism cavity separate from the internal cavity,
the housing further comprises a bottom cavity that is open at a bottom of the housing and is structured and configured to house the multi-state actuator, and the multi-state actuator is housed in one of the activation mechanism cavity or the bottom cavity, thereby enabling the dispenser to be used in the right-handed or the left-handed position.

12. The dispenser of claim 10, the housing further comprising a housing frame and a housing insert, wherein the housing insert has an external shape that fits within housing frame and the housing insert can be flipped upside down, thereby enabling the dispenser to be used in the right-handed or the left-handed position.

13. The dispenser of claim 1, wherein the multi-state actuator is a spring activated touch latch assembly comprising a latch base and a latch extension, and the multi-state actuator is a bi-state actuator.

14. The dispenser of claim 13, the dispenser further comprising:
a removable cap having a securing mechanism to attach the cap to one of a top or a bottom of the housing, and an opening structured and configured to retain the latch base while allowing the latch extension to protrude through the opening; and
a removable base having a securing mechanism to attach the base to the other of the top or the bottom of the housing.

15. The dispenser of claim 1, the housing further comprising a housing frame and a housing insert, wherein
the housing insert has an external shape that fits within the housing frame, and
the housing frame has a cavity defined by a back wall, a first side wall, a second side wall, a floor, a ceiling, and a plurality of mounting protrusions on the floor and the ceiling, wherein
the housing insert houses flossers; and
the housing insert further includes a plurality of first mounting receivers in a top, a plurality of second mounting receivers in a bottom, and an interior back wall having a bottom layer interior groove aligned with a bottommost flosser, wherein the bottom layer interior groove is sized to enable a portion of the bottommost flosser to rotate from a stored position in the housing insert through the bottom layer interior groove so the bottommost flosser can be removed from the housing.

16. The dispenser of claim 15, wherein the mounting protrusions fit into the mounting receivers when the housing insert is placed inside the housing frame.

17. The dispenser of claim 1, wherein the underside of the top surface of the cover is in magnetic contact with the multi-state actuator in both the compressed position and the extended position.

18. A method of using a product dispenser, the method comprising:
pressing a cover down to engage a multi-state actuator;
releasing engagement with the cover to cause the cover to move into an activated configuration and expose a portion of a housing, the housing being structured and configured to fit substantially within the cover when the cover is in a closed configuration;
pulling a product forward through a first cutout on an open area of a front face of a bottom end of the housing, wherein a portion of the housing prevents the product from falling out when the cover is in the activated configuration and when the cover is removed from the housing:,
pressing the cover down a second time to re-engage the multi-state actuator and move the cover into a closed configuration.

19. The method of claim 18, wherein
a bottom layer interior groove in an interior back wall near a back corner of the bottom end of the housing permits a portion of a flosser head of a flosser to rotate through the interior back wall for removal;
the bottom layer interior groove is sized to permit no more than one flosser head to rotate through the interior back wall at a time; and
the portion of the housing that prevents the flosser from falling out when the cover is in the activated configuration and when the cover is removed from the housing is a door; and
the underside of a top surface of the cover is in contact with the multi-state actuator in both the compressed position and the extended position.

20. The method of claim 18, further comprising releasing engagement with the cover to cause the cover to remain in a closed configuration.

\* \* \* \* \*